US008843600B1

(12) United States Patent
Gabrielson et al.

(10) Patent No.: US 8,843,600 B1
(45) Date of Patent: Sep. 23, 2014

(54) PROVIDING PRIVATE ACCESS TO NETWORK-ACCESSIBLE SERVICES

(75) Inventors: Jacob Gabrielson, Seattle, WA (US); Zachary J. Hansen, Seattle, WA (US); Diane N. Lye, New York, NY (US)

(73) Assignee: Amazon Technologies, Inc., Reno, NV (US)

( * ) Notice: Subject to any disclaimer, the term of this patent is extended or adjusted under 35 U.S.C. 154(b) by 847 days.

(21) Appl. No.: 12/895,399

(22) Filed: Sep. 30, 2010

(51) Int. Cl.
*G06F 15/177* (2006.01)
*G06F 15/173* (2006.01)
*G06F 15/16* (2006.01)

(52) U.S. Cl.
USPC ........... 709/220; 709/221; 709/222; 709/223; 709/224; 709/225; 709/226; 709/227; 709/228; 709/229; 709/230; 709/238; 709/240; 709/242; 709/243; 709/244; 709/245; 709/248; 709/250

(58) Field of Classification Search
USPC ......... 709/245, 250, 220–222, 223–229, 230, 709/238, 240, 242–244, 248
See application file for complete search history.

(56) References Cited

U.S. PATENT DOCUMENTS

| | | | |
|---|---|---|---|
| 6,772,226 B1 * | 8/2004 | Bommareddy et al. | 709/245 |
| 6,931,530 B2 * | 8/2005 | Pham et al. | 713/165 |
| 7,457,824 B1 | 11/2008 | Strom et al. | |
| 2002/0069278 A1 * | 6/2002 | Forslow | 709/225 |
| 2003/0051170 A1 * | 3/2003 | Spearman | 713/201 |
| 2003/0112755 A1 | 6/2003 | McDysan | |
| 2004/0230683 A1 * | 11/2004 | Adamczyk et al. | 709/227 |
| 2005/0193103 A1 | 9/2005 | Drabik | |
| 2006/0005240 A1 | 1/2006 | Sundarrajan et al. | |
| 2006/0233166 A1 | 10/2006 | Bou-Diab et al. | |
| 2006/0253456 A1 | 11/2006 | Pacholec et al. | |
| 2007/0239987 A1 | 10/2007 | Hoole et al. | |
| 2008/0046973 A1 | 2/2008 | Jorgensen | |
| 2008/0240122 A1 | 10/2008 | Richardson et al. | |
| 2009/0013030 A1 * | 1/2009 | Choudhury | 709/203 |
| 2009/0063685 A1 * | 3/2009 | Common | 709/227 |
| 2009/0300152 A1 * | 12/2009 | Ferris | 709/223 |
| 2010/0115606 A1 * | 5/2010 | Samovskiy et al. | 726/15 |
| 2011/0019661 A1 * | 1/2011 | Ku | 370/352 |

OTHER PUBLICATIONS

Timothy et al., "The case for enterprise-ready virtual private clouds", HotCloud'09 Proceedings of the 2009 conference on Hot topics in cloud computing, Article No. 4, 2009.*
Cohesive Flexible Technologies—VcubeV, retrieved Dec. 9, 2008, from http://www.cohesiveft.com/Developer/, 1 page.

(Continued)

*Primary Examiner* — Edward Kim
(74) *Attorney, Agent, or Firm* — Seed IP Law Group PLLC

(57) ABSTRACT

Techniques are described for managing communications for a managed virtual computer network overlaid on a distinct substrate computer network. The techniques may be used in situations in which a configurable network service provides managed virtual computer networks for clients and also provides one or more network-accessible services that are available to the managed virtual computer networks, with particular managed virtual computer networks being configured to provide local private access to at least one of the provided network-accessible services, despite those provided network-accessible services being located externally to the particular managed virtual computer networks. In some situations, a Lightweight Directory Access Protocol ("LDAP") network-accessible service is provided, and a logical endpoint for the LDAP service is created within a managed virtual computer network to enable the multiple computing nodes of the managed virtual computer network to communicate with one or more LDAP computer servers from the LDAP service.

23 Claims, 12 Drawing Sheets

(56) References Cited

OTHER PUBLICATIONS

Cohesive Flexible Technologies—VPN-Cubed, retrieved Dec. 9, 2008, from http://www.cohesiveft.com/vpncubed/, 2 pages.

CohesiveFT Elastice Server: VPN-Cubed: Technical Overview, retrieved Dec. 9, 2008, from http://blog.elasticserver.com/2008/12/vpn-cubed-technical-overview.html, 4 pages.

Cohesive Flexible Technologies—CohesiveFT FAQ, retrieved Dec. 9, 2008, from http://www.cohesiveft.com/FAQ/, 10 pages.

Enomalism: Elastic Computing Platform—Virtual Server Management: Home—True Elastic Computing, retrieved Aug. 26, 2008, from http://www.enomalism.com/, 2 pages.

Enomalism: Elastic Computing Platform—Virtual Server Management: Home—Open Source Cloud Computing, retrieved Aug. 26, 2008, from http://www.enomalism.com/, 2 pages.

Cohen, R., "ElasticVapor :: Life in the Cloud—Virtual Private Cloud (VPC)," Thursday, May 8, 2008, retrieved Aug. 26, 2008, from http://elasticvapor.com/search/label/Virtualization, 6 pages.

Active Directory, retrieved Sep. 21, 2010, from http://en.wikipedia.org/wiki/Active_directory, 9 pages.

OpenDS FAQ—Project Definition, retrieved Sep. 21, 2010, from https://www.opends.org/wiki/Wiki.jsp?page=ProjectDefinition&skin=print, 3 pages.

Paxos algorithm, retrieved Sep. 21, 2010, from http://en.wikipedia.org/wiki/Paxos_algorithm, 16 pages.

Krishnan, U., et al., "Scalable Centralized Authentication Services using Red Hat Directory Server—Netgroups and its usage," retrieved on Sep. 21, 2010, from http://www.redhat.com/f/pdf/rhas/NetgroupWhitepaper.pdf, 13 pages.

\* cited by examiner

Fig. 2E mapping information 262c

| | | | | |
|---|---|---|---|---|
| Z | H1 | ... | 10.0.5.1 | 200.0.0.3 |
| Z | H1 | | 10.0.0.0/28 | <error> |
| Z | H2 | | 10.0.0.0/28 | 200.0.10.3 |
| | | ... | ... | ... |

214w, 214x, 214y
214a, 214b, 214c, 214d, 214e mapping information 212c

| | | | | |
|---|---|---|---|---|
| Z | A | ... | 10.0.0.3 | 200.0.10.2 |
| Z | A | | 10.0.0.1 | 200.0.10.5 |
| Z | A | | 10.0.0.4 | 200.0.0.6 |
| Z | A | | 10.0.5.0/28 | 200.0.10.3 |
| Z | A | | 10.0.5.1 | 200.0.0.3 |
| Z | C | | 10.0.0.0/28 | 200.0.10.3 |
| | | ... | ... | ... |

213v, 213w, 213x, 213y, 213z
213a, 213b, 213c, 213d, 213e

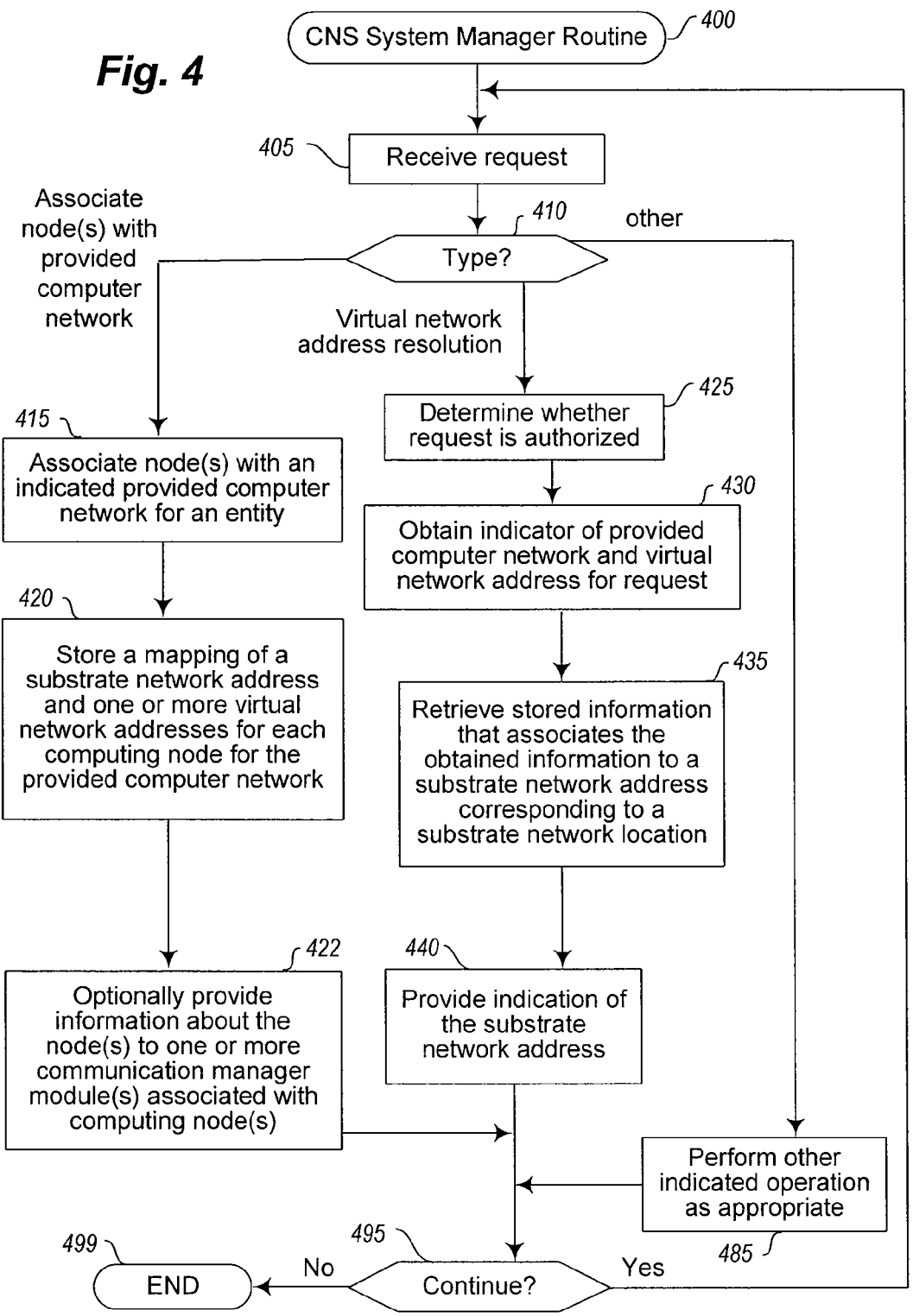

PROVIDING PRIVATE ACCESS TO NETWORK-ACCESSIBLE SERVICES

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A-2E illustrate examples of managing communications involving computing nodes of a managed virtual overlay computer network.

FIG. 4 illustrates a flow diagram of an example embodiment of a CNS System Manager routine.

DETAILED DESCRIPTION

Figure 1A:
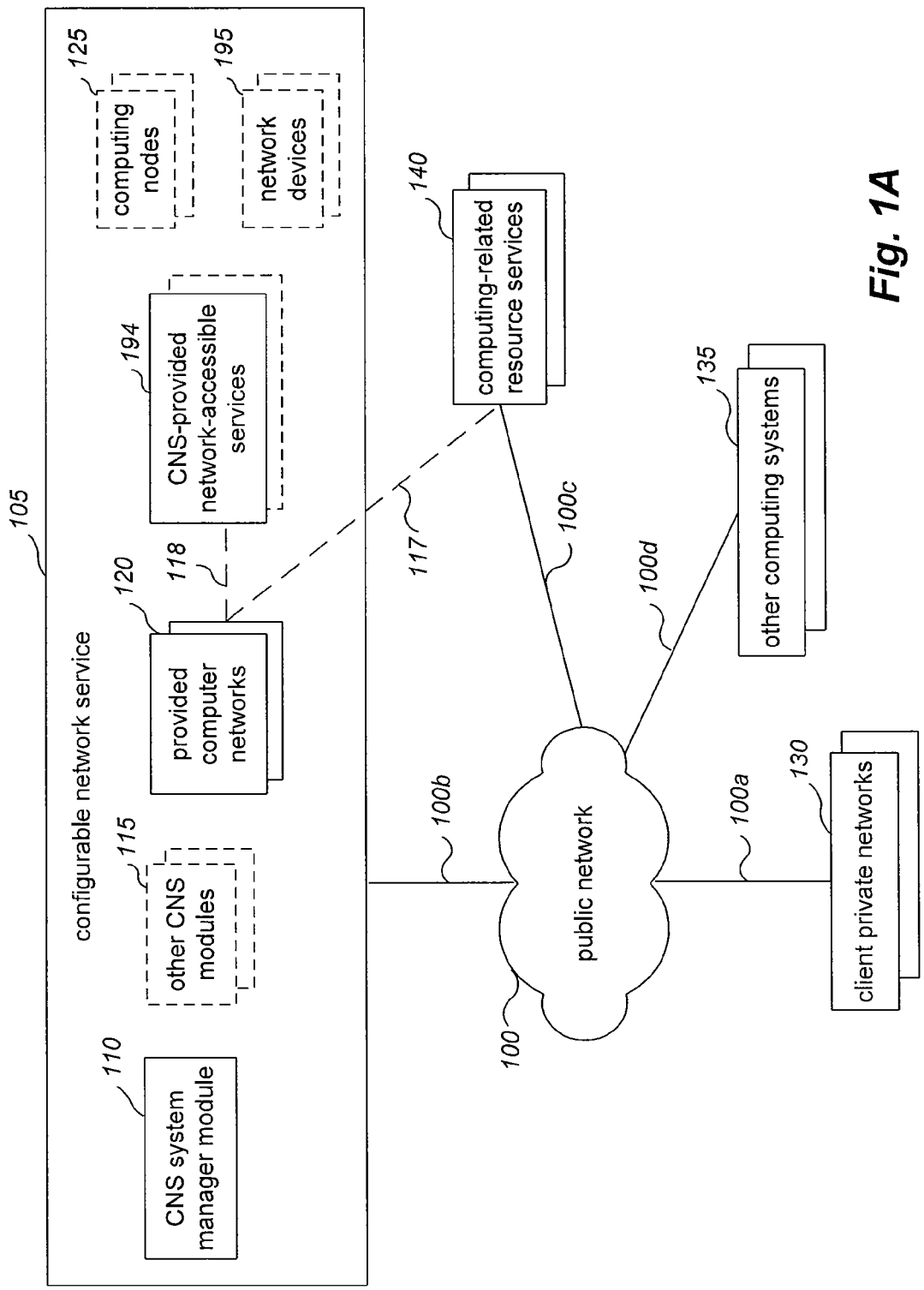
FIGS. 1A-1C are network diagrams illustrating example embodiments of managing communications for computing nodes belonging to a managed computer network.

Techniques are described for providing managed computer networks, such as for managed computer networks that are each implemented as a virtual computer network overlaid on one or more other computer networks. The managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet), while in other embodiments a single user or entity may implement its own configurable network service to provide the described techniques for one or more of its own managed computer networks. In at least some embodiments, the techniques include managing communications for various computing nodes of a particular managed virtual computer network overlaid on a substrate network, including in situations in which the configurable network service provides one or more network-accessible services that are available to various managed virtual computer networks, and the particular managed virtual computer network is configured to provide local private access to at least one of the provided network-accessible services, despite those provided network-accessible services being located externally to the particular managed virtual computer network. As one example, a configurable network service that is providing a managed computer network for a client may also provide a network-accessible Lightweight Directory Access Protocol ("LDAP") service that includes multiple LDAP computer servers, a client for whom a particular managed virtual computer network is being provided may configure the managed virtual computer network to use the LDAP service, and a logical endpoint for the LDAP service may be created within the managed virtual computer network to enable the multiple computing nodes of the managed virtual computer network to communicate with one or more LDAP computer servers from the LDAP service in the same manner as the multiple computing nodes communicate with each other. In at least some embodiments, some or all of the described techniques are automatically performed by embodiments of a system manager module and/or one or more communication manager modules, such as modules that are part of a network-accessible configurable network service.

Thus, the managing of communications for a managed virtual computer network overlaid on a substrate network may in at least some embodiments include managing communications involving one or more computing nodes of the managed computer network that are connected to the substrate network and/or involving one or more external computer servers of a network-accessible service that are integrated into or otherwise part of the virtual computer network. For example, the computing nodes of the managed virtual computer network may in some embodiments each have an associated communication manager module that manages communications to and/or from the computing node, and the communication manager module associated with a source computing node that is sending a communication to one or more indicated final destinations may in at least some situations facilitate the sending of that communication. Similarly, any external computer servers of a network-accessible service that are integrated into the managed virtual computer network may in some embodiments have one or more associated communication manager modules that manage communications to and/or from the external computer servers, and if the external computer servers are located external to the substrate network, may further in some embodiments have one or more associated external connections that interconnect the substrate network to a remote location of the external computer servers (e.g., by using one or more edge modules connected to the substrate network that operate as communication manager modules to manage communications to and/or from the external computer servers as they pass between the substrate network and the external connections). For example, a communication manager module that receives a communication from an associated computing node or computer server may assist in determining a corresponding intermediate or final destination location within the substrate network to which a destination virtual network address used in the communication is mapped (e.g., based on a specified network topology of the managed virtual computer network), and take actions to encode the communication for the substrate network so that it will be forwarded to the determined destination location, as discussed in greater detail below. In at least some embodiments, a provided network-accessible service may be integrated into a particular managed virtual computer network by assigning one or more of the virtual network addresses for that managed virtual computer network to represent the provided network-accessible service, and a communication manager module that receives a communication from an associated computing node that is directed to such an assigned virtual network address may similarly take actions to forward the communication to the network-accessible service external to the managed virtual computer network in a manner that is transparent to the sending computing node, as is also discussed in greater detail below.

By enabling various managed virtual computer networks to access and use a provided network-accessible service in a private local manner, various benefits may be provided. For example, LDAP services and other types of network-accessible services may be difficult for an individual client to configure and implement within that client's managed computer network—thus, by providing a managed version of such a network-accessible service that is accessible to multiple clients, the managed computer networks of the multiple clients may obtain the benefits of the functionality of the network-accessible service without the difficulties and redundancies of each client implementing their own distinct copy of the network-accessible service. In addition, by enabling a managed computer network to have a local logical endpoint within the managed computer network to the external provided network-accessible service (e.g., by assigning one or more virtual network addresses of the managed computer network to locally represent the external provided network-accessible service), the computing nodes may securely send communications that include confidential information to the local logical endpoint within the managed computer network, and the configurable network service may perform additional actions to transparently forward those communications outside the managed computer network to the external provided network-accessible service in a secure manner (e.g., by encrypting those communications, or otherwise inhibiting access of third parties to the contents of those communications). Furthermore, in at least some embodiments, a network-accessible service provided by the configurable network service may provide additional capabilities that would be difficult or impossible for a single client to implement, such as to provide a plurality of computer servers for the network-accessible service, to assign particular computer servers from the plurality to particular managed computer networks, and to optionally dynamically modify the computer servers assigned to a particular managed computer network (e.g., to scale the functionality available to a particular managed computer network from the network-accessible service to reflect changing demand from that particular managed computer network, such as to transparently add additional computer servers from the network-accessible service to a group assigned to the particular managed computer network while the managed computer network is operational and using the network-accessible service, or to transparently replace a computer server in the pool that becomes unavailable with a new computer server added to the pool). Moreover, the configurable network service may further perform additional operations in some embodiments to facilitate authentication of requests being sent to a network-accessible service from a particular managed computer network provided for a client, such as by transparently using previously provided administrative information associated with the client and/or with particular computing nodes of the managed computer network. Additional details and other benefits are described below, and will also be apparent to those skilled in the art.

In some embodiments and situations, a network-accessible service provided by the configurable network service may include multiple computer servers available to provide a particular type of functionality to managed computer networks that use the network-accessible service, and a group of one or more of those computer servers may be selected to provide functionality to a particular managed computer network. Each such computer server of a network-accessible service may be dedicated for use with at most a single managed computer network at a time in some embodiments, while in other embodiments a particular such computer server may be used to simultaneously support multiple managed computer networks and/or multiple clients, such as by using a joint tenancy model where each such client or managed computer network has access to only its own stored data.

When multiple computer servers of a network-accessible service are part of the group assigned to provide the functionality of the network-accessible service to a particular managed computer network, those multiple computer servers may be managed in various manners in various embodiments. For example, one of the multiple computer servers of the group may be designated as a master server, and one or more other of the multiple computer servers of the group may be designated as replica servers that are each maintained as a copy of the master server—if so, communications that are requests to store data may be directed to the master server, for example, while communications that are requests to store data may optionally be directed to one of the replica servers rather than the master server (e.g., to reduce the load on the master server, to reduce latency for the response if a replica server is closer than the master server, etc.). In situations involving a pool of multiple computer servers that provide the functionality of a network-accessible service to a managed computer network, the computing nodes of the managed computer network may be unaware that more than one computer server is providing the functionality, and may direct all communications for the network-accessible service to a single virtual network address assigned to represent the network-accessible service, but the configurable network service may direct each of the communications to a particular one of the multiple computer servers of the pool for the managed computer network. A particular computer server of a pool may be automatically selected for a communication from a computing node of a managed computer network in various manners, such as based on one or more of the following non-exclusive list: a type of the communication (e.g., whether the communication requests to store data, to retrieve stored data, etc.); on a type of the computer server (e.g., a master server, a replica server, etc.); on a location of computer server and/or computing node (e.g., to select a computer server that is logically and/or geographically near to the computing node, such as based on using an anycast communication); on the particular computing node (e.g., if certain computer servers support certain computing nodes, such as to continue a session or other ongoing communication between a particular computing node and particular computer server); etc.

In some embodiments and situations, a pool of multiple computer servers of a network-accessible service for a particular managed computer network may not have a single master server, at least temporarily. For example, a prior master server may have become unavailable (e.g., may have failed), or a master server may not have previously selected (e.g., if the pool newly has multiple computer servers, such as if one or more additional computer servers have recently been added to a single computer server that was previously in the pool, or if a pool of multiple computer servers is newly created). In addition, in some situations, two or more computer servers in a pool may each temporarily be operating as a master server, such as if each of those master servers is unaware of the other master servers. In at least some such embodiments, the configurable network service may perform various techniques to maintain a single master server for a pool with multiple computer servers of a network-accessible service, such as by using a manager for the network-accessible service to select a single master from the multiple computer servers, or by configuring the computer servers of the network-accessible service to execute a consensus algorithm that cooperatively elects a single master server in a distributed manner. One non-exclusive example of such a consensus algorithm is the Paxos family of consensus protocols, with additional details related to Paxos being available in "Generalized Consensus and Paxos," Leslie Lamport, Microsoft Research Technical Report MSR-TR-2005-33, March 2005, which is incorporated herein by reference in its entirety.

The functionality of a particular network-accessible service may be provided for use by managed computer networks of clients in exchange for fees paid by those clients in at least some embodiments. In such embodiments, the fees charged to a managed computer network of a client for use of a network-accessible service may have various forms, such as one or more of the following non-exclusive list: one or more fees that are not usage-based, such as a one-time fee and/or a periodic subscription fee (e.g., a specified amount per month); a fee for each computer server in a pool assigned to the managed computer network (e.g., 14 cents per hour per computer server, optionally after a specified quantity of free server hours per month, such as 25); a fee for data transferred in to the network-accessible service from the managed computer network (e.g., 10 cents per gigabyte, optionally after a specified quantity of free gigabytes transferred per month, such as 1); a fee for data transferred out of the network-accessible service to the managed computer network (e.g., a tiered fee of 0 cents per gigabyte for the first 1 gigabyte per month, 15 cents per gigabyte for the next 9 gigabytes per month, 11 cents per gigabyte for the next 40 gigabytes per month, 9 cents per gigabyte for the next 100 gigabytes per month, 8 cents per gigabyte for any additional gigabytes per month, etc.); a fee for data stored by the network-accessible service for the managed computer network (e.g., 25 cents per gigabyte stored per month, optionally after a specified quantity of free gigabytes stored per month, such as 1); etc. In some embodiments, a client may further be able to supply some or all of the computer servers that a managed computer network of the client uses as part of a pool for a network-accessible service (e.g., by paying a fee to purchase or lease such computer servers, by making remote computer servers of the client available to the network-accessible service, by making one or more computing nodes of the managed computer network available for use by the network-accessible service, etc.), and the fees charged to a client may vary based on whether or not the computer servers in a pool for the client's managed computer network are supplied by the client. Various other factors may further affect fees in other embodiments and situations, including whether a client uses computer servers of a network-accessible service that are dedicated to the client's managed computer network or are shared with other managed computer networks.

In some embodiments, the configurable network service may further perform additional operations to facilitate interactions between a managed computer network and a network-accessible service being integrated with the managed computer network, such as to assist in authenticating or otherwise identifying to the network-accessible service that particular communications come from a particular managed computer network and/or from a particular computing node of the managed computer network. For example, in some embodiments the configurable network service may assign a unique identifier to each managed computer network and/or to each computing node of a managed computer network, and include such identifiers for a sender when forwarding communications from the sender to the network-accessible service—such identifiers may further be supplied in some embodiments as part of a program execution service that facilitates the execution of particular programs on particular computing nodes, as described in greater detail below, and that provides identifiers for each such program and/or computing node. In addition, a client may provide particular administrative information to the configurable network service (e.g., an identifier previously used by the client with the network-accessible service), such as before, during or after initiating the creation of a particular managed computer network, and the configurable network service may automatically use such administrative information when communicating with the network-accessible service on behalf of the client's managed computer network, whether instead of or in addition to unique identifiers as previously discussed. Additional details related to such facilitating of the operations between a managed computer network and an integrated network-accessible service are included in U.S. patent application Ser. No. 12/332,216, entitled "Providing Local Secure Network Access To Remote Services" and filed Dec. 10, 2008, which is hereby incorporated by reference in its entirety.

As previously noted, in some embodiments the configurable network service provides one or more network-accessible services that include an LDAP service, such as to provide directory services to managed computer networks. Additional details related to LDAP are available at "Request For Comments 4510-Lightweight Directory Access Protocol (LDAP): Technical Specification Road Map", June 2006, Internet Engineering Task Force ("IETF"), which is hereby incorporated by reference in its entirety. This document is also available at the time of filing at tools<dot>ietf<dot>org<slash>html<slash>rfc4510 (where <dot> and <slash> are replaced by the corresponding characters with those names, "." and "/", respectively). A non-exclusive list of other network-accessible services that may be provided in at least some embodiments, whether instead of or in addition to an LDAP service, include the following: a firewall service; a virus checking service; a spam checking service; an intrusion detection service; an intrusion prevention service; a content analysis service; a content modification service, including encryption/decryption; a content provision service, such as to include one or more RSS feeds or other forms of content on a push and/or pull basis; a wide area network ("WAN") acceleration or other network acceleration service; a virtual private network ("VPN") connection endpoint service; etc.

In addition, in some embodiments the configurable network service controls some or all information about the use of a network-accessible service by a managed computer network (e.g., a quantity of computer servers in a pool for that managed computer network, whether and how the computer servers are divided among master servers and replica servers, how a particular computer server is selected to handle a particular communication, how a particular computer server is selected as the master server for a pool, etc.), while in other embodiments some or all of such operations may be based in whole or in part on configuration information specified by the client for whom the managed computer network is provided. When specified by a client, the client may provide particular information related to the use of a network-accessible service in various manners, such as by having a user representative of the client interactively use a GUI ("graphical user interface") provided by the configurable network service or by that network-accessible service for that purpose and/or by having an executing program of the client interact with an API ("application programming interface") provided by the configurable network service or by that network-accessible service for that purpose. As one example, a client may specify a particular virtual network address to be used to represent a network-accessible service within a managed computer network for the client, or may instead specify multiple virtual network addresses to be assigned to various computing nodes and to one or more network-accessible services by the configurable network service (e.g., by using DHCP, or Dynamic Host Configuration Protocol).

As noted above, in at least some embodiments, the described techniques include managing communications for a managed computer network being provided, including in embodiments in which the managed computer network is a virtual computer network that is overlaid on one or more underlying substrate computer networks, and in which external network-accessible services are integrated into particular managed computer networks to enable secure local communications to be used by the computing nodes of those managed computer networks when communicating with the integrated network-accessible services. In such embodiments, communications may be encoded in various manners before being sent over an underlying substrate network (e.g., to use substrate network addresses for the communication source and/or final destination in the encoded communication that correspond to locations within the substrate network, and that are distinct from virtual network addresses used for the communication source and/or final destination in the original pre-encoded communication), and the described techniques may be used in conjunction with such encoded communications, as discussed in greater detail below. Before discussing some additional details of managing such communications in particular manners, however, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the existence and use of the intermediate physical network(s) being transparent to the computing nodes (e.g., with the computing nodes being unaware of and/or being unable to detect the intermediate physical networks) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a client user or other client entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to encode the communications for the intermediate physical networks (e.g., to use substrate network addresses that are based on the networking protocol of the substrate network), and by modifying the communications that leave the intermediate physical network(s) to decode the communications (e.g., to use virtual network addresses that are based on the networking protocol of the virtual computer network if the decoded communication is to be provided to a computing node of the virtual computer network, to use external public network addresses if the decoded communication is to be forwarded over one or more external public networks, etc.). Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities) or other clients, such as by providing and using numerous computing nodes that are in one or more geographical locations (e.g., in one or more data centers) and that are inter-connected via one or more intermediate physical networks. The CNS system may use various communication manager modules (and optionally edge modules that perform functionality of communication manager modules) at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes (and any external nodes) of each virtual computer network being managed, such as to map the substrate network address of each such computing node to the one or more overlay virtual network addresses associated with the computing node, and such as to map the external network address of each such group of one or more external nodes and the substrate network address of an associated edge module to the one or more overlay virtual network addresses associated with the external node(s). Similarly, if one or more computer servers of a network-accessible service are integrated into a managed virtual computer network, the CNS system may track and use various information about those computer servers for that managed virtual computer network, such as to map the substrate network address or external network address of each such computer server to the one or more overlay virtual network addresses associated with the computer server for that managed virtual computer network. Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes and external nodes may include, for example, one or more of the following non-exclusive list: a quantity of the multiple computing nodes to include as part of the virtual computer network; one or more particular computing nodes to include as part of the virtual computer network; one or more external nodes to associate with the virtual computer network; a range or other group of multiple virtual network addresses to associate with the multiple computing nodes and/or external nodes of the virtual computer network; particular virtual network addresses to associate with particular computing nodes, particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; network topology information for the virtual computer network, such as to specify logical subnets and/or other logical topology of the virtual computer network; information about any access restrictions involving particular types of communications and/or particular destinations that are allowed or disallowed for particular computing nodes and/or external nodes; one or more virtual network addresses to be associated with a network-accessible service being integrated into a managed virtual computer network; policies or other defined behavior to be associated with use of a particular network-accessible service; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130 or otherwise connected to one or more such remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules, edge modules, etc.), in conjunction with various optional computing nodes 125 and/or networking devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). In addition, one or more of the provided computer networks 120 may each include one or more external nodes that are integrated into the provided computer network, such as an external node that is one of the other computing systems 135 (e.g., operated under control of an entity other than a provider or operator of the configurable network service, such as a client to whom the computer network 120 is provided or instead a third-party to the client and the configurable network service provider) or that is located within one of the private networks 130 for the client to whom the computer network 120 is provided (e.g., operated under control of the client). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to or otherwise connected with remote client computer networks 130 that are private networks, in other embodiments the provided computer networks 120 may be standalone computer networks that are not connected to other existing computer networks 130 and/or may be extensions to or otherwise connected with other client computer networks 130 that are not private networks.

Furthermore, in the illustrated embodiment, the configurable network service 105 provides one or more network-accessible services 194 that are available to be used by at least some of the provided computer networks 120, such as for a particular network-accessible service to be integrated within a particular provided computer network 120 in a manner that enables secure local communications to be used by the computing nodes of the provided computer network 120 when communicating with that integrated network-accessible service. Each provided computer network 120 that integrates a network-accessible service 194 may, for example, have a logical endpoint within the provided computer network 120 that enables the computing nodes of the provided computer network 120 to communicate with the integrated network-accessible service 194 in a private secure manner that is local to the provided computer network 120, and with the configurable network service managing a logical connection 118 between the provided computer network 120 and the location(s) outside of the provided computer network 120 of one or more computer servers of the integrated network-accessible service 194. In the illustrated example, the provided network-accessible services 194 may each include multiple computer servers (not shown), at least some of which may be provided by or otherwise under the control of the CNS 105, while in other embodiments at least some other computing systems 135 and/or computer systems at client private networks 130 may be used to provide some or all computer servers for one or more of the provided network-accessible services 194—such other computing systems 135 and/or computer systems at client private networks 130 may, for example, be provided by or under control of the client whose computer network 120 uses those computing systems as part of a network-accessible service's integration into that computer network 120, or instead may be computing systems that are provided by third parties (e.g., for a fee).

Private access between a remote client private computer network 130 and a corresponding private computer network 120 provided for a client may also be enabled in various ways, such as by establishing a VPN connection or other private connection between them that allows intercommunication over the public network 100 in a private manner. For example, the CNS 105 may automatically perform appropriate configuration on its computing nodes and other networking devices to enable VPN access to a particular private network 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network 120) to establish the VPN access. After VPN access has been appropriately enabled and/or configured, a VPN connection may be established between the remote client private network 130 and the provided private computer network 120, such as initiated by the client using IPsec ("Internet Protocol Security"), or instead a VPN connection or other private connection may be established to or between networks that use MPLS ("Multi Protocol Label Switching") for data transmission or other appropriate communication technologies. In addition, in the illustrated example, various remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources (e.g., long-term storage capabilities, such as block storage that is mountable by particular computing nodes of the provided computer networks 120, or storage that is otherwise accessible from particular computing nodes of the provided computer networks 120 using API calls). Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100b and 100c). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. Furthermore, in at least some embodiments, a client may interact with the module 110 to configure network topology information for a computer network provided for the client (e.g., via one or more programmatic interactions with an API provided by the CNS 105), including to specify one or more external nodes for the provided computer network, and such network topology information may later be dynamically modified for a provided computer network in at least some such embodiments, such as after the provided computer network has already been in use by the client. Moreover, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client. In addition, in at least some embodiments, a client may interact with the module 110 to configure integration of one or more network-accessible services 194 with a computer network 120 provided for the client (e.g., via one or more programmatic interactions with an API provided by the CNS 105), and such integration with one or more network-accessible services may later be dynamically modified for a provided computer network in at least some such embodiments, such as after the provided computer network has already been in use by the client.

Network addresses may be configured for a provided computer network in various manners in various embodiments. For example, the client may specify one or more address ranges (e.g., a Classless Inter-Domain Routing ("CIDR") address block) or other groups of network addresses for the provided computer network, such that at least some of the specified network addresses are used for the computing nodes of the provided computer network and/or for one or more network-accessible services integrated with the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). In other embodiments, the CNS 105 may automatically select network addresses to be assigned to at least some computing nodes of at least some provided computer networks, at least some network-accessible services integrated with at least some provided computer networks, and/or at least some external nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere. Similarly, one or more external nodes may be specified for a particular provided virtual computer network, and each of the external nodes may be associated with an edge module of the CNS 105 that manages communications to and from its associated external node(s), and if so, the associated edge module for an external node may take various actions to emulate desired functionality of a network with respect to that external node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other computing systems external to the provided computer network, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Similarly, external nodes may have various forms, and be provided by the CNS system or by other entities that are unrelated to the operator of the CNS system in various embodiments. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by reheadering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same networking addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed, including with respect to using particular types of network-accessible services in particular manners and to integrating network-accessible services in managed computer networks in particular manners (e.g., to integrate a network-accessible LDAP service within a managed computer network by assigning one or more virtual network addresses for the managed computer network to locally represent the LDAP services). These examples are provided for illustrative purposes and are simplified for the sake of brevity, and the inventive techniques may be used in a wide variety of other situations, some of which are discussed below.

Figure 1B:
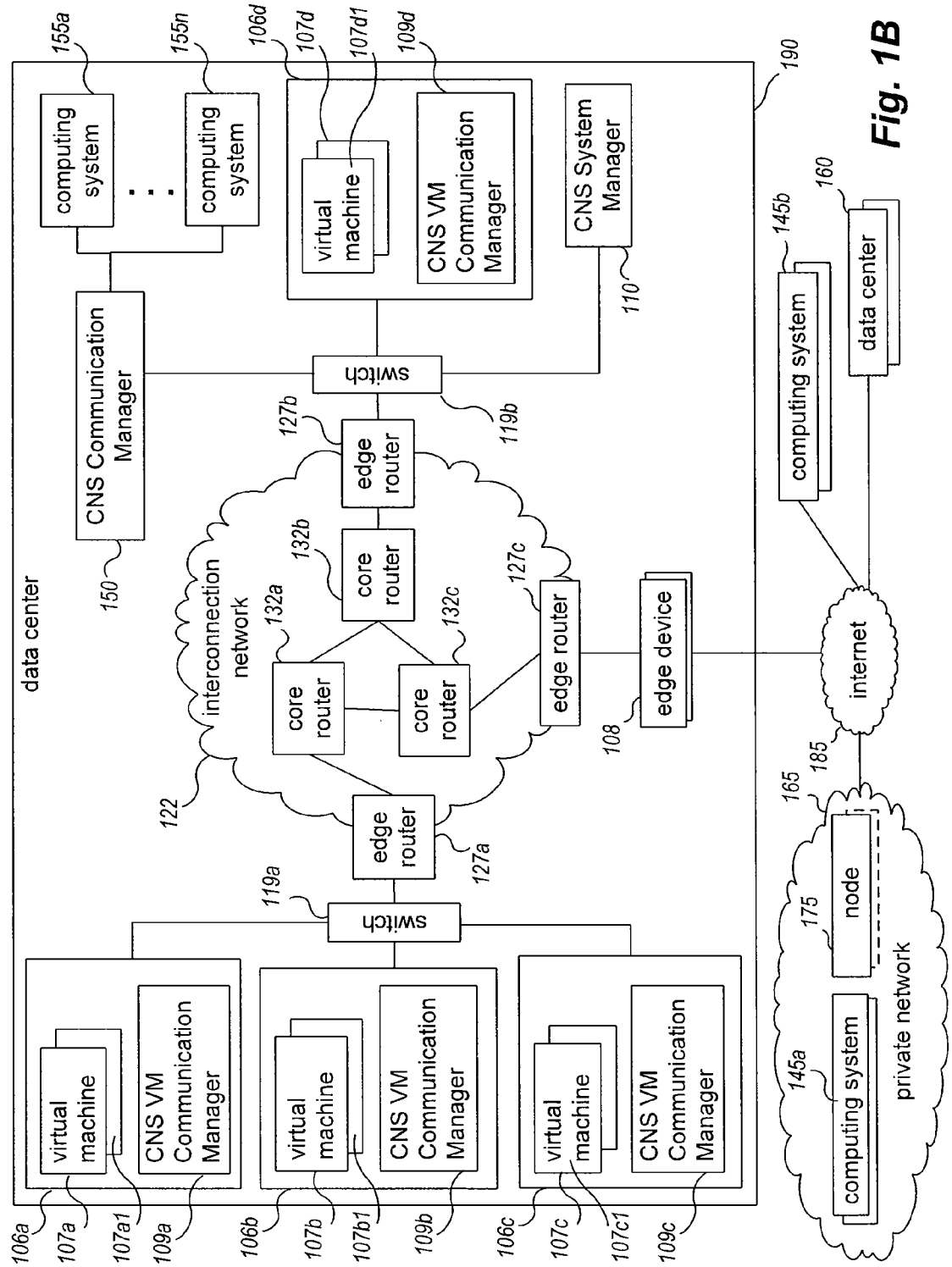

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module, multiple communication manager modules, and one or more edge modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected via one or more edge devices 108 to an internet 185 external to the data center 190, which provides access to one or more computing systems 145a and possible external nodes 175 located within private network 165, to one or more other globally accessible data centers 160 that each have multiple computing systems (not shown) and may include possible external nodes (not shown), and to one or more other computing systems 145b that may also be possible external nodes. Some or all of the edge devices 108 may be configured to operate as or otherwise implement one or more edge modules to manage external nodes, including to provide functionality of communication manager modules. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, and a System Manager module 110 that executes on one or more computing systems (not shown). In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices separate from the physical computing systems 155a-155n, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119a-119b, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127c and the core routers 132a-132c. The edge routers 127a-127c provide gateways between two or more physical sub-networks or networks. For example, edge router 127a provides a gateway between the physical sub-network established by switch 119a and the interconnection network 122, while edge router 127c provides a gateway between the interconnection network 122 and internet 185 (e.g., via the edge devices 108). The core routers 132a-132c manage communications within the interconnection network 122, such as by routing or otherwise forwarding packets or other data transmissions as appropriate based on characteristics of such data transmissions (e.g., header information including source and/or destination substrate addresses, protocol identifiers, etc.) and/or the characteristics of the interconnection network 122 itself (e.g., routes based on the physical network topology, etc.). In addition, the edge devices 108 may further manage communications between computing nodes at the data center 190 and other external computer systems that are not external nodes integrated into one or more virtual computer networks overlaid on the substrate interconnection network 122 (e.g., external computing systems 145a, external computing systems 145b, computing systems at other external data centers 160, etc.).

The illustrated System Manager module, Communication Manager modules, and edge modules may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments by using the edge modules to assist in integrating one or more external nodes outside of the data center 190 into the virtual computer network. In other embodiments, a particular virtual computer network may optionally be extended beyond the data center 190 in other manners, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line or other direct circuit; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are placed between edge router 127c and the global internet 135 (e.g., if the edge devices 108 each provide at least some of the functionality of a Communication Manager module in encoding and decoding communications for virtual computer networks to use the underlying substrate network 122), or instead based on one or more other Communication Manager modules external to the data center 190 (e.g., if another Communication Manager module, not shown, is made part of private network 165, so as to manage communications for computing systems 145a over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by the edge device 108 of the data center 190 managing the communications between computing nodes of the private network 165 and particular data center 190 computing nodes.

Thus, as one illustrative example, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further both be assigned to a specified logical subnet of that virtual computer network that includes a subset of the computing nodes for that virtual computer network, such as with the IPv4 networking protocol being used to represent the virtual network addresses for the virtual computer network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified logical subnet). The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
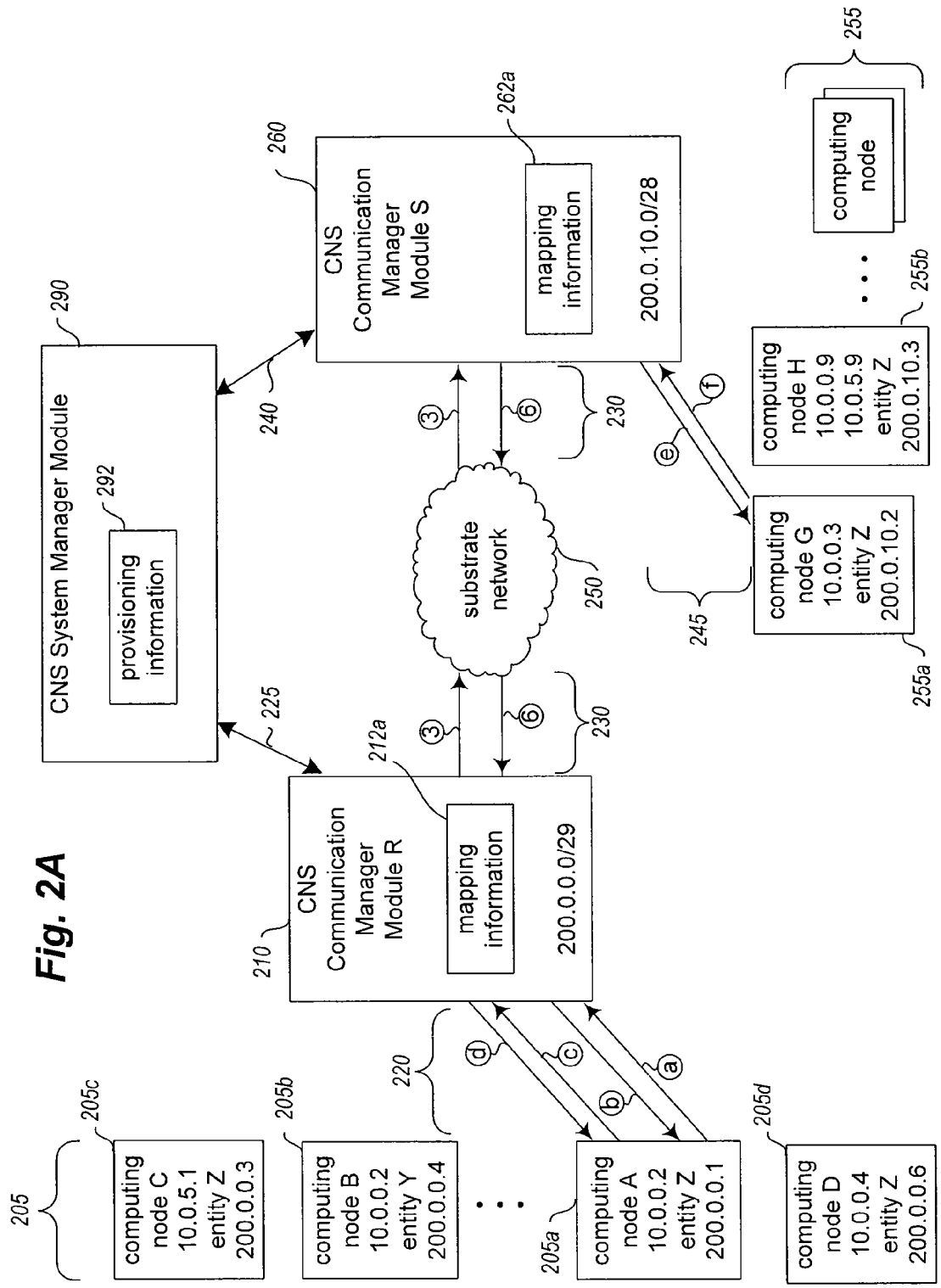
Figure 2B:
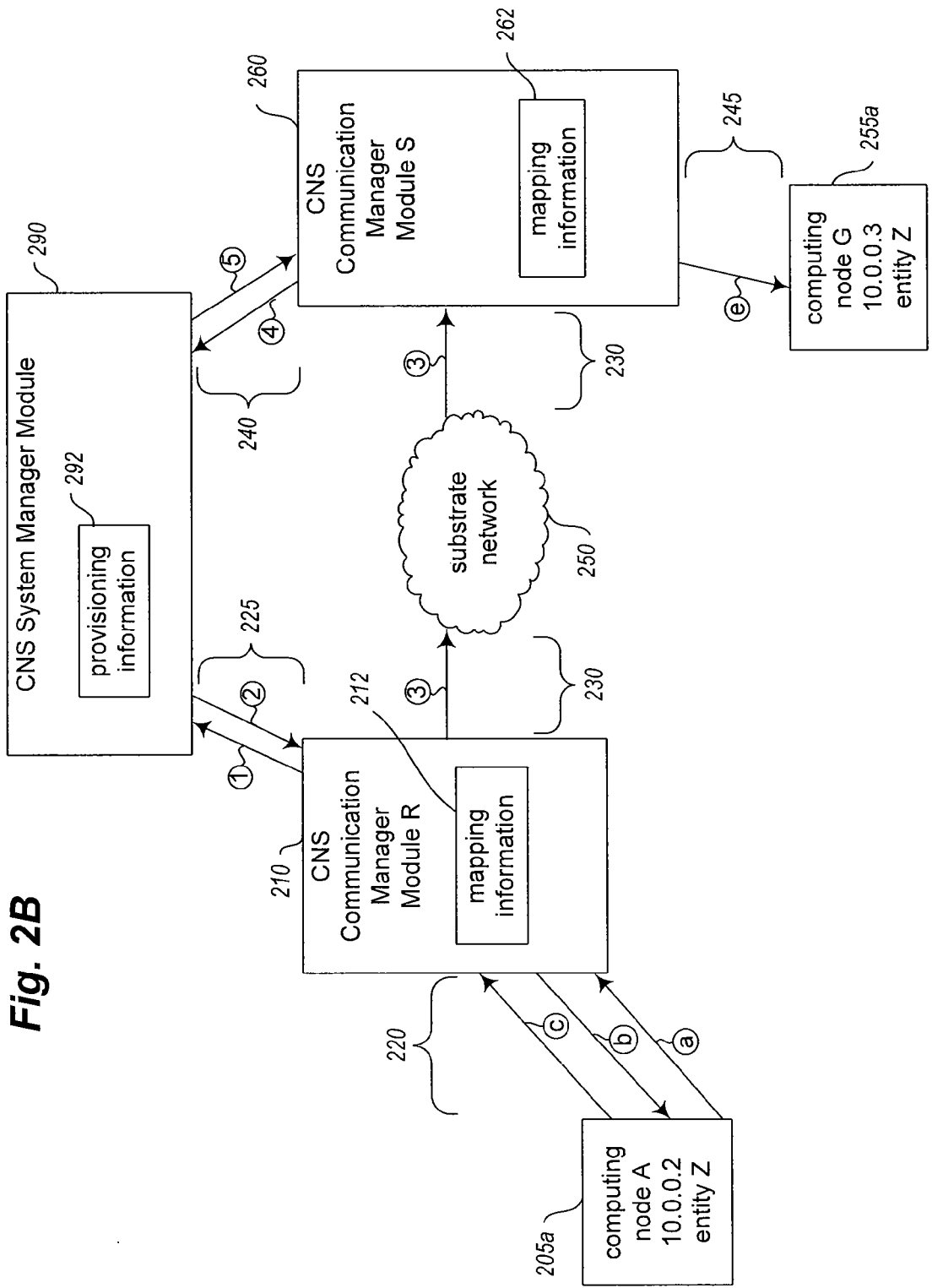

If the Communication Manager module 109a determines that the outgoing communication is authorized (or does not perform such an authorization determination), the module 109a determines the actual physical substrate network location corresponding to the destination virtual network address for the communication. For example, the Communication Manager module 109a may determine the actual destination substrate network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual destination substrate network address, such as if Communication Manager module 109d is associated with a range of multiple such actual substrate network addresses. FIGS. 2A-2B provide examples of doing such communication management in some embodiments.

When Communication Manager module 109d receives the communication via the interconnection network 122 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2B. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards or otherwise provides the modified communication to the destination virtual machine computing node 107d1, such as via shared memory (not shown) of the computing system 106d that is used to provide a logical network interface for the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107a1 on physical computing system 106a by the interconnection network 122 in the example embodiment of FIG. 1B, virtual machine computing node 107d1 on physical computing system 106d may be configured to be part of the same logical sub-network of the virtual computer network as computing node 107a1 (e.g., to not be separated by any logical router devices specified for the provided virtual computer network). Conversely, despite the physical proximity of virtual machine computing node 107c1 on physical computing system 106c to virtual machine computing node 107a1 on physical computing system 106a (i.e., being part of the same physical sub-network without any intervening physical substrate router devices) in the example embodiment of FIG. 1B, computing node 107c1 may be configured to be part of a distinct logical sub-network of the virtual computer network from that of computing node 107a1 (e.g., may be configured to be separated by one or more specified router devices of the provided virtual computer network, not shown, which in this example are virtual router devices that are not physically provided for the virtual computer network). If computing nodes 107*a*1 and 107*d*1 are configured to be part of the same logical sub-network, the previous example of sending a communication from computing node 107*a*1 to computing node 107*d*1 may be performed in the manner previously described, without emulating the actions of any intervening virtual router devices (despite the use of multiple physical router devices in the substrate interconnection network 122 for forwarding the communication), since computing nodes 107*a*1 and 107*d*1 are configured to be part of single sub-network in the specified network topology.

However, if computing node 107*a*1 sends an additional communication to computing node 107*c*1, the Communication Manager modules 109*a* and/or 109*c* on the host computing systems 106*a* and 106*c* may perform additional actions that correspond to one or more virtual specified router devices configured in the specified network topology for the provided virtual computer network to separate the computing nodes 107*a*1 and 107*c*1. For example, the source computing node 107*a*1 may send the additional communication in such a manner as to initially direct it to a first of the virtual specified router devices that is configured to be local to computing node 107*a*1 (e.g., by including a virtual hardware address in the header of the additional communication that corresponds to that first virtual specified router device), with that first virtual specified router device being expected to forward the additional communication on toward the destination computing node 107*c*1 via the specified logical network topology. If so, the source Communication Manager module 109*a* may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107*a*1 and 107*c*1. For example, each virtual router device that forwards the additional communication may be expected to take actions such as modifying a TTL ("time to live") hop value for the communication, modify a virtual destination hardware address (e.g., a MAC, or Media Access Control, hardware address) that is specified for the communication to indicate the next intended destination of the additional communication on a route to the destination computing node, and/or otherwise modify the communication header. If so, the source Communication Manager module 109*a* may perform some or all of those actions before forwarding the additional communication directly to the destination Communication Manager module 109*c* over the substrate network (in this case, via physical switch device 119*a*) for provision to destination computing node 107*c*1. Alternatively, some or all such additional actions to provide the virtual networking functionality for the sent additional communication may instead be performed by the destination Communication Manager module 109*c* after the additional communication is forwarded to the Communication Manager module 109*c* by the Communication Manager module 109*a*.

Furthermore, as part of the prior continuing example, computing node 107*a*1 may determine to send a third communication to a final destination computer system external to the data center and the interconnection network 122, such as to a particular external node 175 that is integrated into the computer network to which computing node 107*a*1 belongs, or such as to a particular computing system 145*a* (e.g., with the particular computing system 145*a* not being part of the virtual computer network to which computing node 107*a*1 belongs). In this situation, the Communication Manager module 109*a* on the host computing system 106*a* that is associated with the source computing node 107*a*1 may further perform additional actions to support the use of an intermediate destination for the communication. If the third communication is being sent to a particular external node 175, the Communication Manager module 109*a* determines that the external node 175 is associated with one of the edge devices 108, and encodes the outgoing third communication from the source computing node 107*a*1 for forwarding over the substrate network 122 from the host computing system 106*a* to that edge device 108. That edge device 108 may be or have an edge module that receives the encoded third communication, decodes the received communication by removing substrate-specific information and/or formatting, determines a particular external network address of the destination external node 175 (e.g., based on a mapping of that external network address to a virtual network address assigned to the destination external node 175), optionally adds network-identifying information to the decoded communication, and forwards the decoded communication over the internet 185 to the destination external node 175. For example, in order to determine how to forward the third communication to the destination external node 175, the edge device edge module 108 may identify the type of encoding to use for that destination external node 175 (e.g., a particular publicly routable external network address associated with the destination external node 175, such as to direct the communication to the edge of the private network 165, and/or various information specific to the private network 165, such as information about a VLAN identifier or MPLS label that the private network 165 uses to represent the managed virtual computer network) and encode the communication accordingly, and may further use a particular external connection (e.g., a VPN connection over the internet 185). By providing virtual networking functionality using the described techniques, the CNS system provides various benefits. For example, because the various Communication Manager modules and edge modules manage the overlay virtual network, specified networking devices and other network topology do not need to be physically implemented for virtual computer networks being provided, and thus corresponding modifications are not needed to the interconnection network 122 to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables external nodes to be integrated into virtual computer networks and used in specified manners, such as to enable the virtual computer network to obtain access to functionality that may not otherwise be available.

Furthermore, the CNS system may in some embodiments provide one or more network-accessible services that are available for use by particular managed computer networks. As one example, the CNS system may provide a network-accessible LDAP service, and use various computer systems at the data center 190 (and/or elsewhere) to provide functionality for the LDAP service—such LDAP computer systems may include, for example, one or more of the computing systems 155 and/or one or more of the virtual machines 107*b* on host computing system 106*b*. If so, and if the LDAP service is integrated in the previously discussed example managed computer network, computing nodes within the managed computer network may direct communications to the LDAP service by using one or more virtual network addresses of the managed computer network that represent the LDAP service. Thus, as part of the prior continuing example, computing node 107a1 may determine to send a fourth communication to the integrated LDAP service by using a particular virtual network address assigned to the LDAP service for the managed computer network. The Communication Manager module 109a receives the outgoing communication, and in at least some embodiments determines whether to authorize the sending of the outgoing communication, such as based on previously obtained information about the sending virtual machine computing node 107a1 and/or about the configuration of the LDAP service within the managed computer network, and/or by dynamically interacting with the System Manager module 110 (e.g., to obtain an authorization determination, to obtain some or all such information, etc.). If the Communication Manager module 109a determines that the outgoing communication is authorized (or does not perform such an authorization determination), the module 109a determines an actual physical substrate network location corresponding to the LDAP, which may include selecting one of multiple LDAP servers in a pool for use by the managed computer network, as discussed further below—for purposes of this example, virtual machine 107b1 on computing system 106b is selected as being the LDAP computer server to receive the outgoing communication, and a corresponding substrate network address is identified by Communication Manager module 109a for use with the outgoing communication. The Communication Manager module 109a then re-headers or otherwise modifies the outgoing communication so that it is directed to Communication Manager module 109b of computing system 106b, and forwards the modified outgoing communication over the substrate network. When Communication Manager module 109b receives the communication (via the physical switch 119a of the substrate network in this example), it performs actions similar to those described previously for a destination communication manager module, including to modify the communication into a format expected by the LDAP service (e.g., to include an identifier associated with the managed computer network for authentication and/or identification purposes), and to forward or otherwise provide the modified communication to the destination virtual machine 107b1 LDAP computer server of the LDAP service. The LDAP computer server implemented by the destination virtual machine 107b1 may then respond accordingly to the received communication, such as to respond to one or more requests made in one or more such received communications.

As noted in the prior example, the sending Communication Manager module 109a may select an LDAP server to receive the outgoing communication for the managed computer network, optionally in a coordinated manner with the System Manager module 110 or as otherwise directed by the System Manager module 110. For illustrative purposes, consider a situation in which the managed computer network has an associated pool of three LDAP computer servers that provide the functionality of the LDAP service to the managed computer network, with those three LDAP computer servers being provided by virtual machine 107b1, computing system 155a, and a computing system (not shown) at one of the other data centers 160. As discussed elsewhere, the particular LDAP computer server from the pool may be selected in various manners, such as based on the LDAP computer server of virtual machine 107b1 being the current master server and on the outgoing communication being part of a request to store a new directory entry, based on use of an anycast protocol and/or load balancing techniques, etc. Furthermore, the configurable network service may take additional actions at times to support the use of the LDAP service, such as to use a consensus algorithm to select a master server from the pool (e.g., if the current master server becomes unavailable), to dynamically expand or shrink the LDAP computer servers in the pool (e.g., based on current demand, based on current or previously specified instructions from the client, etc.), to replace an LDAP computer server in the pool that becomes unavailable, etc.

Figure 1C:
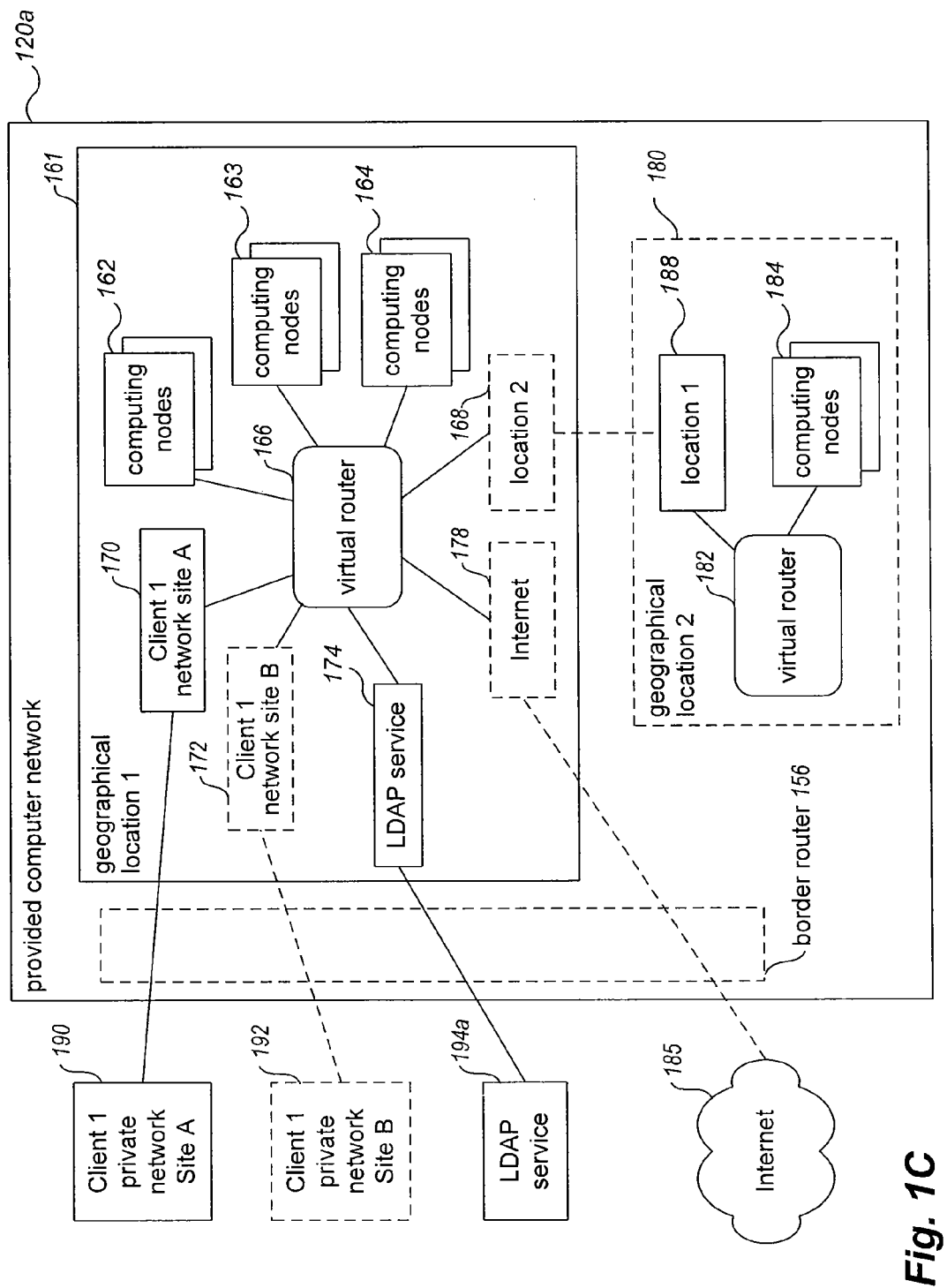

FIG. 1C illustrates additional details regarding an example computer network 120a that may be provided by the CNS system 105 of FIG. 1A (or other embodiment of a configurable network service) for a client, with the provided computer network 120a in this example being a private network extension to a remote private computer network of the client, such as one of the remote private computer networks 130 of FIG. 1A. In this example, various connections and communication paths for the provided computer network 120a are shown in a conceptual manner.

In particular, in FIG. 1C, the provided computer network 120a includes various computing nodes provided by the CNS 105 that are located at a first geographical location 1 161 (e.g., at a first data center at the geographical location 1, such as data center 190 of FIG. 1B), with the various computing nodes being configured into logical groups 162, 163 and 164 in this example (e.g., to correspond to different subnets and/or associated configured networking devices, not shown). In this example, a single conceptual virtual router 166 is shown at geographical location 1 to control communications between those computing nodes and other computing systems, so as to illustrate different types of communications that may occur, although the provided computer network 120a may actually have multiple or no configured networking devices at geographical location 1, and the computer network 120a may be implemented by the configurable network service at the geographical location 1 in various manners, such as via multiple physical interconnected routers or other networking devices, by using an underlying substrate network and associated modules that control communications over the underlying substrate network, etc. In this example, the virtual router 166 operates in accordance with the configured information for the provided computer network 120a, including configured network topology information, configured integration of one or more network-accessible services, and other configured network access constraint information, such as to route communications that are sent to network addresses within the provided computer network 120a to corresponding destination computing nodes on the provided computer network 120a, and to route other communications to other network addresses outside of the provided computer network 120a as appropriate. Furthermore, communications that are not permitted by configured firewall devices, configured network topology information, or other configured network access constraints may be blocked or otherwise managed by the virtual router 166.

In this example, the computer network 120a is provided for an example Client 1, and is a network extension to a remote computer network of Client 1. Client 1's remote computer network includes multiple computing systems (not shown) at a first remote location Site A 190, and the virtual router 166 is configured to communicate with those multiple computing systems via a virtual communication link 170 at the geographical location 1. For example, as discussed in greater detail elsewhere, the provided computer network 120a may include one or more configured VPN connections to the multiple computing systems at Site A 190, and the communication link 170 may correspond to one or more such VPN connections. In addition, the remote computer network of Client 1 may optionally include computing systems at one or more other locations, such as the illustrated optional Site B 192, and if so the virtual router 166 may further be configured to communicate with those other computing systems at the other locations, such as via an optional virtual communication link 172 to Site B 192 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network 120*a* may be configured to allow all, some or no communications between the computing nodes of the provided computer network 120*a* and other external computing systems that are generally accessible on the Internet 185 or other public networks. If at least some such external communications are allowed, the virtual router 166 may further be configured to communicate with those external multiple computing systems via an optional virtual communication link 178 of the provided computer network 120*a*, such as in conjunction with an optional virtual border router 156 for the provided computer network 120*a*. The virtual border router 156 may be physically implemented in various manners, such as by the CNS 105 using one or more actual firewall devices or border router devices that manage communications between external computing systems and the various computing nodes provided by the CNS 105 at geographical location 1 (e.g., actual devices that support numerous computer networks provided by the CNS 105 to clients that use those computing nodes of the CNS 105), by using an underlying substrate network and associated modules that control communications over the underlying substrate network (e.g., to prevent disallowed communications from being sent by computing nodes of the provided computer network 120*a* onto the substrate network), etc. Furthermore, the virtual border router 156 may further conceptually assist in managing other communications to other computing systems external to the provided computer network 120*a*, such as to the remote client computer network at Sites A and B, etc.

In addition, the provided computer network 120*a* may be configured to provide private local access to one or more network-accessible services, such as by assigning one or more network addresses of the provided computer network 120*a* to represent those one or more network-accessible services, and by optionally configuring particular actions to be taken for communications sent to those assigned network addresses. In this example, the virtual router 166 has been configured to provide local access to a network-accessible LDAP service 194*a* via a logical endpoint 174 that is part of the provided computer network 120*a*. Thus, for example, if one of the computing nodes of the provided computer network 120*a* sends a communication to a particular network address of the provided computer network 120*a* that is mapped to the endpoint 174, the virtual router may forward that communication to an appropriate LDAP computer server of the LDAP service 194*a* that is actually located external to the provided computer network 120*a*. In other embodiments, the network-accessible service 194*a* may implement an interface that is part of the CNS 105 or otherwise at the geographical location 1, and if so the communications sent to the particular network address of the provided computer network 120*a* that is mapped to the endpoint 174 may instead be forwarded to that interface of the network-accessible service for handling, such as to enable the network-accessible service to select a particular appropriate computer server of the network-accessible service to handle those communications.

In addition, the logical endpoint 174 may be configured in at least some embodiments to manage communications sent via the endpoint in various manners other than using a pool of computer servers specific to the provided computer network 120*a*, such as to modify those communications in one or more manners before they are forwarded to the network-accessible service 194*a*, or to otherwise access the network-accessible service 194*a* in a specialized manner. For example, in the illustrated embodiment, the endpoint 174 may be configured to correspond to a particular namespace within the network-accessible service 194*a*, with a subset of the resources available from the network-accessible service 194*a* being part of that namespace. Accordingly, the endpoint 174 may be configured to access resources within the particular namespace, such as by modifying or translating communications to use a name or other identifier associated with the particular namespace, by using a particular interface of the network-accessible service that supports indicating a particular namespace, etc. In addition to or instead of configuring the endpoint 174 to access a particular namespace of the network-accessible service 194*a*, the endpoint may be configured in at least some embodiments to provide additional information to the network-accessible service 194*a* to allow the network-accessible service 194*a* to validate the location or other source of the communications as being the provided computer network 120*a*. For example, in the illustrated embodiment, the endpoint 174 may be configured to correspond to one or more particular identifiers or other access control indicators that are associated with the provided computer network 120*a* by the configurable network service or by the network-accessible service 194*a*, so that a subset of new and/or existing computing-related resources provided by the network-accessible service 194*a* that are accessed via the endpoint 174 are associated with the access control indicator(s), for use by the network-accessible service 194*a* in authentication and/or in restricting access to those resources. Accordingly, the endpoint 174 may be configured to use the specified additional indicator(s) associated with the provided computer network 120*a* in various manners, such as to modify communications to include the additional indicator(s), to send the additional indicator(s) along with the communications without modification of the communications, to use a particular interface of the network-accessible service that supports including such additional indicator(s), etc. Furthermore, while not illustrated here, the provided computer network 120*a* may be similarly configured to access one or more other network-accessible services (not shown) using other endpoints to those other network-accessible services.

In the illustrated embodiment, in addition to the computing nodes of the CNS 105 at geographical location 1, the provided computer network 120*a* may further include computing nodes 184 provided by the CNS 105 that are located at a second geographical location 2 180 (e.g., at a distinct second data center at the geographical location 2, such as one of the data centers 160 of FIG. 1B). Accordingly, the virtual router 166 may be configured to include an optional virtual link 168 to the portion of the provided computer network 120*a* at the geographical location 2. In this example, the portion of the provided computer network 120*a* at the geographical location 2 similarly is illustrated with a conceptual virtual router 182 to manage communications to and from the computing nodes 184, including to communicate with the portion of the provided computer network 120*a* at the geographical location 1 via a virtual link 188. Such communications between computing nodes of the CNS 105 at different geographical locations may be handled in various manners in various embodiments, such as by sending the communications over the Internet or other public networks (e.g., as part of a secure tunnel, such as that uses encryption supported by the CNS 105), by sending the communications in a private secure manner (e.g., via a dedicated lease line between the geographical locations), etc.

It will be appreciated that the example provided computer network 120*a* of FIG. 1C is included for exemplary purposes, and that other computer networks provided by the CNS 105 for clients may not include all of the types of configured elements that are illustrated, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices, communication links and logical endpoints illustrated in FIG. 1C may be implemented using a variety of types of underlying physical devices, connections and modules. In addition, while not illustrated here, clients may perform a variety of other types of interactions with network-accessible services, whether from provided computer networks or instead other remote computing systems, such as to subscribe/register to use particular types of functionality, receive/create various credentials (e.g., user IDs, passwords, etc.), create resources from other remote computing systems (e.g., that are part of a remote private corporate network) that are later accessed from a provided computer network (e.g., a network extension to the private corporate network), etc.

Thus, various aspects of providing managed computer networks are described above, as well as elsewhere in this document, including support for virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a particular logical networking device), such that no single module or physical device is singly responsible for emulating that particular type of functionality, as well as to provide functionality corresponding to integrating external nodes into virtual computer networks.

Figure 2C:
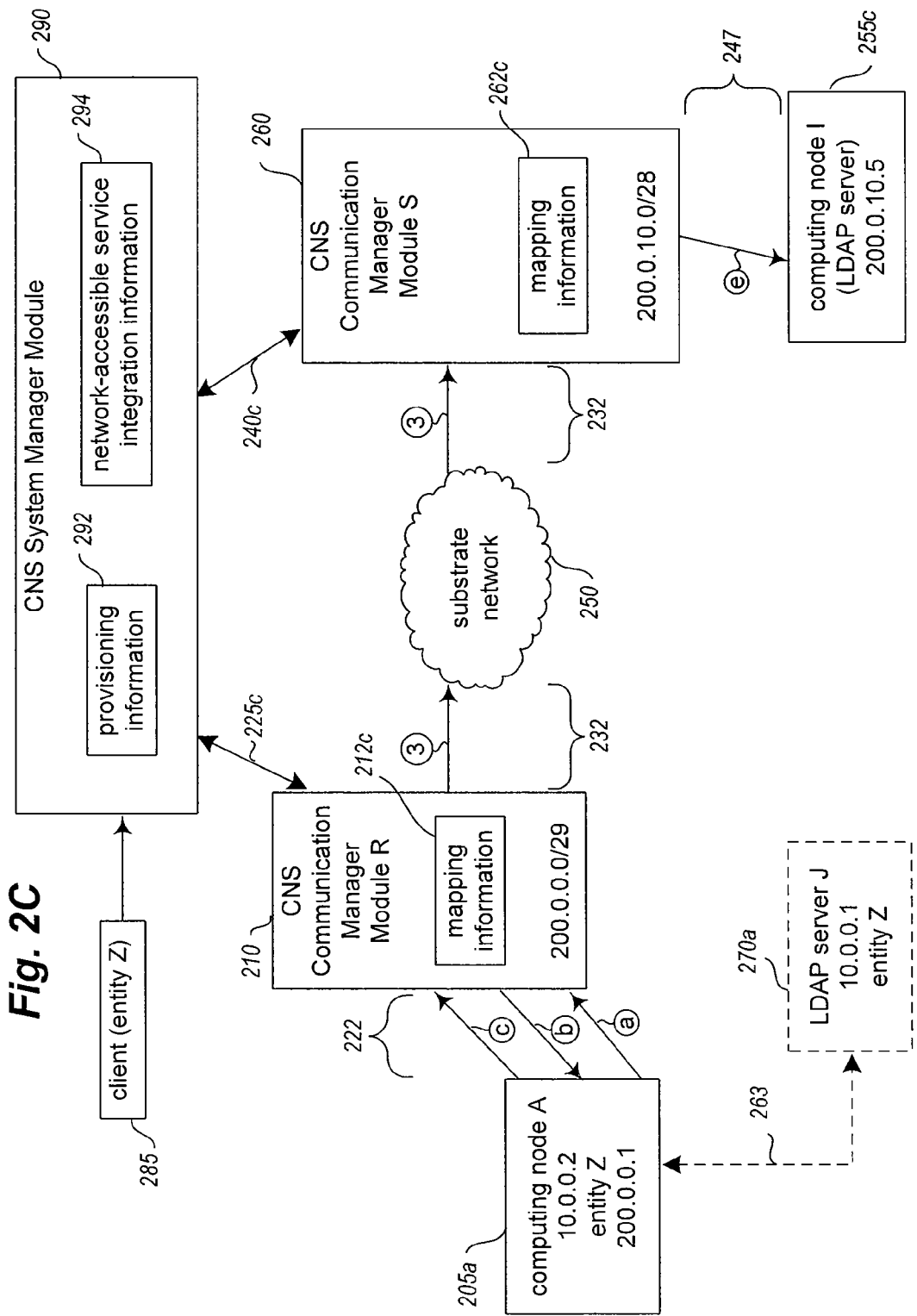
Figure 2D:
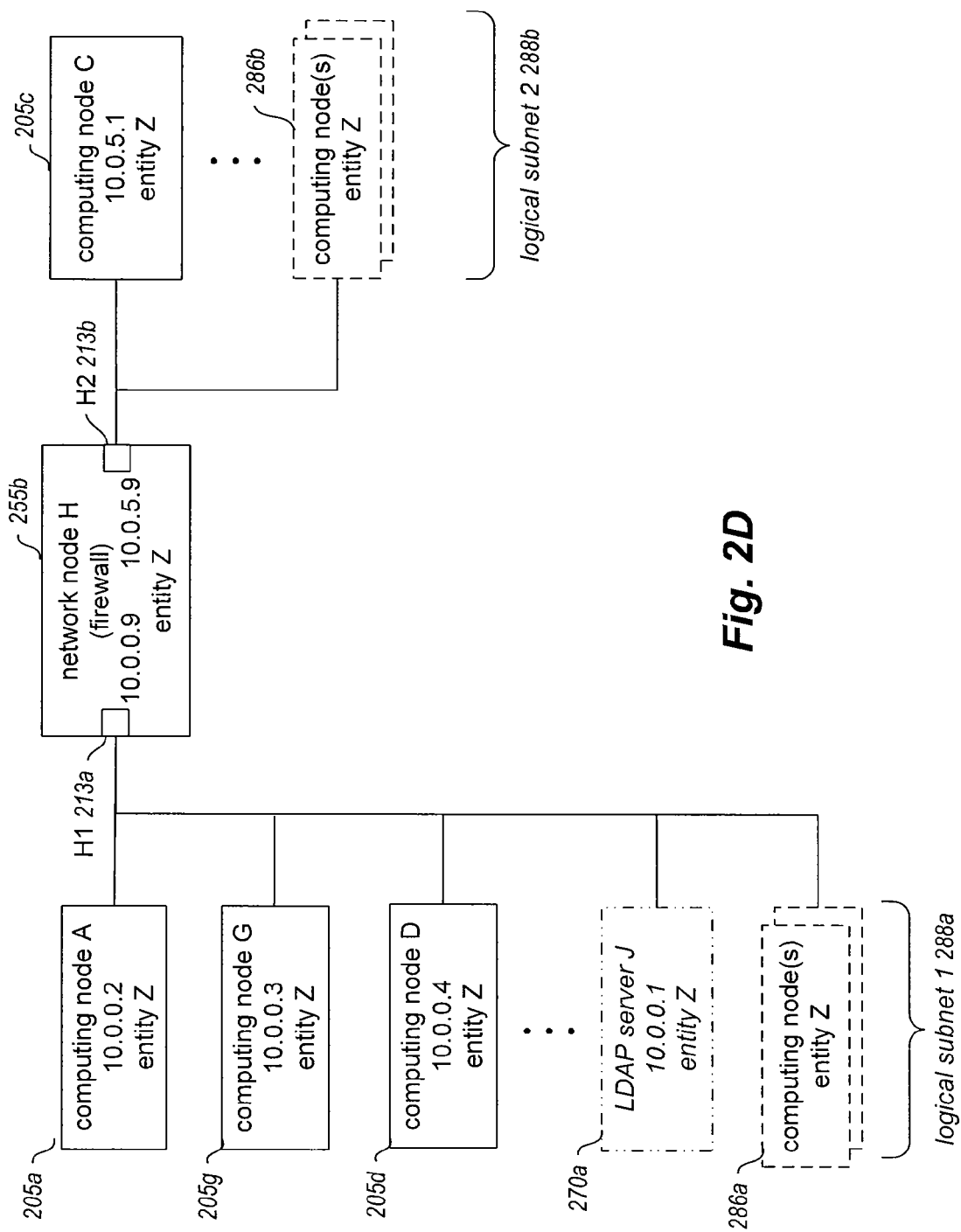

FIGS. 2A-2E illustrate further examples with additional illustrative details related to managing communications involving computing nodes and external nodes that occur via an overlay network over one or more physical networks, such as may be used by the nodes and networks of FIGS. 1A, 1B and/or 1C, or in other situations. In these examples, FIGS. 2A and 2B illustrate details regarding actions of various modules of an example CNS system in managing communications for computing nodes of a managed computer network that are sent directly to their final destinations using virtual network addresses of the managed computer network, while FIGS. 2C-2E illustrate additional details regarding managing communications that are sent to destinations involving a network-accessible service integrated within a managed computer network.

In particular, FIG. 2A illustrates various example computing nodes 205 and 255 that may communicate with each other by using one or more intermediate substrate networks 250. In this example, IPv4 virtual computer networks are overlaid on an underlying substrate network 250 that is a distinct IPv4 network, although in other embodiments the substrate network 250 and/or overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include five computing nodes that are executed on behalf of an example entity Z and that are part of a corresponding first managed virtual computer network provided for client entity Z, those being computing nodes 205*a*, 205*c*, 205*d*, 255*a* and 255*b*. In addition, other computing nodes are operated on behalf of other entities and belong to other provided virtual computer networks, such as computing node 205*b* that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260, although the physical connections are not illustrated in this example. The CNS Communication Manager modules 210 and 260 are physically connected to a substrate network 250, as is the System Manager module 290, although the additional physical interconnections between modules and the substrate network are also not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107*a*, and computing nodes 255 may represent the virtual machines 107*d*. If so, Communication Manager module R would correspond to Communication Manager module 109*a* of FIG. 1B, Communication Manager module S would correspond to Communication Manager module 109*d* of FIG. 1B, the substrate network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1B, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, with the substrate network 250 being an IPv4 network in this example, Communication Manager module R is associated with the IPv4 CIDR block 200.0.0.0/29, so as to enable at least some of the IPv4 addresses from 200.0.0.0 to 200.0.0.7 to each be treated as a substrate network address associated with one of the computing nodes, and Communication Manager module S may similarly be associated with the 16 IPv4 network addresses in the IPv4 CIDR block 200.0.10.0/28. Alternatively, if the substrate network 250 were an IPv6 network, Communication Manager module R may instead, for example, be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA: 01FF: FFFF:FFFF:FFFF (representing 2 to the power of 56 unique IPv6 addresses), where each "X" may represent any hexadecimal character that is appropriate for a particular situation, and the Communication Manager module S may similarly be associated with an IPv6 network address range such as "::0B: 02/72"—if so, the substrate network 250 will forward any communication with a destination network address in the range of "::0A:01/72" to Communication Manager module R, and with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c, 205d, 255a, and 255b are part of a single managed virtual computer network provided for entity Z, and computing nodes 205a, 205c, 205d and 255a have assigned IPv4 virtual network addresses of "10.0.0.2", "10.0.5.1", "10.0.0.4" and "10.0.0.3" and substrate network addresses of "200.0.0.1", "200.0.0.3", "200.0.0.6" and "200.0.10.2", respectively. As discussed in greater detail subsequently, computing node 255b is configured in the network topology for the managed virtual computer network to have two associated virtual network addresses corresponding to two distinct network interfaces, those being "10.0.0.9" and "10.0.5.9", and an associated substrate network address of "200.0.10.3", although in other embodiments each distinct network interface maybe assigned a distinct substrate network address to facilitate mapping functionality of the configurable network service. Because computing node 205b is part of a distinct managed virtual computer network that is provided for entity Y, it can share the same virtual network address as computing node 205a without confusion, although it has a distinct substrate network address. In this example, computing node A 205a intends to communicate with computing node G 255a, with the two computing nodes configured in this example to be part of a single common physical local area sub-network (not shown) in a configured network topology for the managed virtual computer network, as discussed in greater detail with respect to FIG. 2D, and the substrate network 250, associated substrate network addresses, and Communication Manager modules are transparent to computing nodes A and G in this example. In particular, despite the physical separation of computing nodes A and G, the Communication Manager modules 210 and 260 operate so as to overlay the managed virtual computer network for entity Z over the physical substrate network 250 for communications between those computing nodes, including to emulate functionality corresponding to the configured local area sub-network of the managed virtual computer network, so that the lack of an actual local area sub-network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212a of information that maps virtual hardware addresses to corresponding actual physical substrate network addresses, with each of the virtual hardware addresses also corresponding to an IPv4 virtual network address for a particular entity's managed virtual computer network. If the local store 212a does not contain an entry for computing node G (e.g., if none of the computing nodes 205 have previously communicated with computing node G and the System Manager module 290 does not push mapping information to the Communication Manager Module R without request; if a prior entry in local store 212a for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212a for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-b. By maintaining such mapping information 212a, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, with the substrate network 250 being an IPv4 network, the returned actual physical substrate network address corresponding to computing node G in interactions 225 is "200.0.10.2", such as if the System Manager module 290 and/or the Communication Manager module S 260 has previously selected that substrate network address to represent computing node G from the substrate network address range associated with Communication Manager module S 260—thus, a communication sent over the substrate network 250 to "200.0.10.2" will be routed to Communication Manager module S for handling. Alternatively, if the substrate network 250 were an IPv6 network, the returned IPv6 actual physical substrate network address corresponding to computing node G in interactions 225 may be "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical substrate network with a network address range of "::0B:02/72" to which Communication Manager module S corresponds—thus, a communication sent over the substrate network 250 to IPv6 destination network address "::0B:02:<Z-identifier>:10.0.0.3" would similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the substrate network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212a. As previously noted, the actual physical substrate network address is "200.0.10.2" in this example, and Communication Manager module R creates a new IPv4 header for the encoded new communication (or a new IPv6 header if the substrate network were instead an IPv6 network) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212a, by interacting with the System Manager module 290 to obtain that information if not previously obtained, etc.), which in this example is "200.0.0.1", and includes that actual physical substrate network address as the source network address for the new header of the new encoded communication. The actual physical substrate network address for computing node A, if used in a reply by Communication Manager module S on behalf of computing node G, will similarly be routed to Communication Manager module R for forwarding to computing node A. The Communication Manager module R next creates communication 230-3 by modifying communication 220-c so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such reheadering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212a including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the substrate network 250, the substrate network uses the physical destination substrate network address of the encoded communication to route the communication to Communication Manager module S. In doing so, the devices of the substrate network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical substrate network.

When Communication Manager module S receives communication 230-3 via the substrate network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262a that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then provides communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new substrate network communication header using mapping information 262. After forwarding communication 230-6 to the substrate network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header for the overlay virtual computer network using mapping information 212a. Communication Manager module R then provides response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening one or more substrate networks, and substrate network 250 may forward communications encoded for it without any special configuration of any physical networking devices of the substrate network, based on the Communication Manager modules overlaying the virtual computer network over the actual physical substrate network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage, including to optionally use various special reserved multicast group virtual network addresses. When a computing node sends a communication to a virtual network address that is configured to be treated as a broadcast/multicast communication, any Communication Manager module with an associated computing node that has subscribed to that multicast/broadcast would be identified (e.g., based on those Communication Manager modules having subscribed to a corresponding broadcast/multicast group for that virtual network address, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without reheadering of the additional communication to use an header for the substrate network since the communication will not travel over the substrate network. However, if computing nodes 205a and 205c are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the substrate network 250 and/or that natively use the same network addressing protocol as that of the substrate network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via substrate network 250 using that destination substrate network address, and that Communication Manager module would forward those communications to that computing node (e.g., after reheadering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on substrate network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on one or more criteria associated with the communication (e.g., a type of the communication, a size of the communication, a time of the communication, etc.).

As previously noted with respect to FIG. 2A, after Communication Manager module S receives communication 230-3 intended for computing node G via the substrate network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.1"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262a for later use, along with computing node A's virtual network address and a virtual hardware address for computing node A.

FIG. 2C illustrates a further example of managing ongoing communications for the overlay virtual computer network described with respect to FIGS. 2A and 2B for client entity Z, but with communications being managed to support communications to a network-accessible service integrated into the overlay virtual computer network. In addition, FIG. 2D includes additional information related to a specified logical network topology for the managed virtual computer network, and FIG. 2E includes additional information related to the mapping information 212c and 262c used by the Communication Manager modules R and S, respectively. In this example, FIG. 2C illustrates computing node A, Communication Manager modules R 210 and S 260, System Manager module 290, and substrate network 250 in a manner similar to that shown in FIGS. 2A and 2B. In addition, FIG. 2C illustrates a logical representation 270a of an endpoint for an integrated network-accessible LDAP service that is part of the configured network topology for the managed virtual computer network, which in this example is a particular LDAP server J that is part of the pool for the managed virtual computer network that supports the LDAP service, although in other embodiments the logical endpoint may instead generally represent the integrated network-accessible service rather than a particular computer server for that network-accessible service. In addition, the logical endpoint 270a is not actually physically implemented as part of providing the managed virtual computer network in this example—instead, a distinct computing node 1255c within the substrate network provides a physical implementation of an LDAP computer server for the LDAP service that may be used to provide functionality corresponding to LDAP server J (e.g., computing node I may be part of a pool of one or more physical LDAP computer servers for the managed computer network). In particular, in this example, computing node A is sending a communication to LDAP server J of the LDAP service, and the actions of the physically implemented modules 210 and 260 and devices of network 250 in actually sending the communication to computing node 1255c are shown, as well as emulated actions of the logical endpoint 270a in logically forwarding/handling the communication. Furthermore, the System Manager module 290 maintains and uses additional information 294 in FIG. 2C regarding the configuration of network-accessible services for the virtual computer networks being managed, including information regarding how to integrate an example LDAP service into the virtual computer network provided for client entity Z. The information 294 related to the use of the network-accessible LDAP service for the managed virtual computer network may be configured in various manners and at various times. For example, entity Z 285 may directly interact with the System Manager module 290 to configure the use of the LDAP service, such as via an API (not shown) and/or GUI (not shown) that is provided by the module 290 to facilitate obtaining such configuration information. In addition, the use of the LDAP service may be configured, for example, as part of initially creating the virtual computer network for entity Z, and in some embodiments may further be dynamically updated while the virtual computer network is in use.

Thus, in a manner similar to that described with respect to FIG. 2A, computing node A determines to send a communication to LDAP server J, and accordingly exchanges various messages 222 with Communication Manager module R 210. In particular, in this example, computing node A first sends an ARP message request 222-a for virtual hardware address information for LDAP server J, and receives a corresponding response message 222-b in a manner similar to that described in FIG. 2A for messages 220a and 220b. However, unlike the example of FIG. 2A, Communication Manager module R 210 and/or System Manager module 290 may take further actions to select a particular one of multiple LDAP servers for the managed virtual computer network to receive the communication, as discussed in greater detail elsewhere. In this case, computing node I is selected (which is not part of the managed computer network), optionally based on one or more interactions 225c between Communication Manager module R 210 and System Manager module 290 (e.g., to obtain and use corresponding information from information 294), and the mapping information 212c of Communication Manager module R 210 is updated to associate the virtual network address assigned to LDAP server J for the managed computer network (which in this example is "10.0.0.1") to the substrate network address for computing node I (which in this example is "200.0.10.5"). In some embodiments, this mapping to computing node I will be maintained beyond this current communication (e.g., for a fixed period of time, for multiple communications that are part of an ongoing session between computing node A and LDAP server J, etc.), while in other embodiments the mapping determination may be independently made for each communication. As illustrated in further detail with respect to FIG. 2D, the logical endpoint for LDAP server J is configured in this example to be part of the same logical subnet as computing node A, and thus the communication from computing node A to computing node I (as representative of LDAP server J) will not be routed through computing node H 255b before being provided to computing node I, although a similar communication from computing node C to LDAP server J would be first routed through computing node H 255b.

After receiving the response message 222-b from Communication Manager module R, computing node A creates and initiates the sending of a communication to LDAP server J, shown in FIG. 2C as communication 222-c. In particular, the header of communication 222-c includes a destination network address for LDAP server J that is "10.0.0.1", a destination hardware address that is the virtual hardware address provided to computing node A in message 222-b, a source network address for sending computing node A that is "10.0.0.2", and a source hardware address for sending computing node A that is an actual or dummy hardware address that was previously identified to computing node A. From the standpoint of computing node A, the sent communication will be handled in the manner illustrated for logical communication 263. While communication 222-c is logically handled in the manner illustrated for communication 263, the communication 222-c is actually intercepted and handled by Communication Manager module R. In particular, in a manner similar to that described in FIG. 2A for communication 220-

*c*, Communication Manager module R intercepts the communication 222-*c*, modifies the communication as appropriate, and forwards the modified communication over the substrate network 250 to computing node I outside of the managed computer network. To determine the substrate network address to be used for forwarding the modified communication over the substrate network 250, Communication Manager module R extracts the destination virtual network address and destination virtual hardware address from the header of communication 222-*c*, and obtains the mapped substrate network address from mapping information 212*c*. As discussed in greater detail with respect to FIG. 2B, in response to the ARP request message 222-*a* and/or communication 222-*c*, the Communication Manager module R and/or the System Manager module 290 may further perform various optional authentication activities.

After Communication Manager module R determines the actual physical substrate network address to use, it creates a new substrate network communication header that includes that actual physical substrate network address as the destination address, and similarly adds a source substrate network address for computing node A to the new header (in this example, using "200.0.10.5" for the destination address, and "200.0.0.1" for the source address). The Communication Manager module R next creates a new communication 232-3 by modifying communication 222-*c* so as to replace the prior IPv4 header with the new header (e.g., in accordance with SIIT), including populating the new header with other information as appropriate for the new communication (e.g., payload length, traffic class packet priority, etc.), and forwards communication 232-3 over the substrate network 250. The substrate network then uses the destination substrate network address of the communication 232-3 to route the communication to Communication Manager module S. When Communication Manager module S receives communication 232-3 via the substrate network 250, it performs actions similar to those described in FIG. 2A with respect to communication 230-3, including to optionally perform interactions 240*c* with the System Manager module 290 to determine if the communication is authorized, to update mapping information 262*c* to reflect any new information about computing node A, to modify the communication to include an appropriate IPv4 header for the LDAP server (including to optionally modify the formatting and/or information in a manner specific to the LDAP service), and to provide the modified communication as communication 247-*e* to computing node I. While not illustrated here, computing node I may determine to send one or more response communications to computing node A, and if so such response communications will be handled in a manner similar to that discussed with respect to communications 245-*f*, 230-6 and 220-*d* of FIG. 2A, including for Communication Manager module R 210 to modify the communication(s) provided to computing node A so that they appear to be sent directly from the logical endpoint 270*a* for LDAP server J.

While not illustrated in FIG. 2C, computing node C may further decide to send an additional communication to LDAP server J, and send a similar message to that of request 222-*a* by specifying LDAP server J's virtual network address for the managed computer network of "10.0.0.1". However, this other communication from computing node C would be handled differently from the prior communication from computing node A. In particular, such communications between computing node C and LDAP server J would be configured to first pass through initial intermediate computing node H before being forwarded to its final destination, since computing node C and LDAP server J are part of separate logical subnets in the specified network topology for the managed virtual computer network. Accordingly, the information maintained by the System Manager module 290 for use in directing communications from computing node C to LDAP server J reflects that computing node H is an initial intermediate destination for such communications. Thus, in response to an interaction from Communication Manager module R analogous to that of 225*c* in which the substrate network address corresponding to virtual network address of "10.0.0.1" is requested by computing node C, the System Manager module 290 indicates that LDAP server J's virtual network address corresponds to the intermediate substrate network address of "200.0.10.3" for computing node H (at least for communications sent from computing node C), as part of the substrate network routing path from computing node C to LDAP server J. In addition, if multiple LDAP computer servers are used in a pool for the managed computer network, the final destination for the communication from computing node C may optionally be selected to be an LDAP computer server other than computing node I, although the use of such different underlying LDAP computer servers will be transparent to computing nodes A and C in at least some embodiments. When computing node H receives such a communication from computing node C, it optionally performs various firewall-related activities for the communication, based on its configuration, and may determine to forward the communication on to its final destination of computing node I (or some other LDAP server selected to be used). As discussed in greater detail elsewhere, such intermediate computing nodes via which some inter-node communications may be directed may provide a variety of other types of capabilities in other embodiments and situations. Furthermore, as noted elsewhere, computing node H may in some such situations determine to modify the communication in one or more manners based on its firewall policies. In order to forward the communication on to its final destination, computing node H updates the received communication so that it has a new destination hardware address that corresponds to the final destination (optionally after performing interactions with Communication Manager module S to obtain that address), and continues to use the destination virtual network address of "10.0.0.1" for LDAP server J. The computing node H then sends the modified communication out, using its logical network interface for logical subnet 1 to which LDAP server J belongs, and Communication Manager module S intercepts and modifies the communication to be routed to its final destination in a manner similar to that previously discussed.

In this manner, the CNS system may provide functionality corresponding to the integration of a network-accessible service into a virtual computer network, including in accordance with a specified network topology from the virtual computer network, without any special configuration of the computing nodes of the managed virtual computer network or of the substrate network physical networking devices, based on the Communication Manager modules overlaying the virtual computer network on the actual substrate network in such a manner as to provide the desired functionality. Various other types of actions than those discussed with respect to FIGS. 2A-2C may be performed in other embodiments, including for types of network addressing protocols other than IPv4 and/or IPv6.

As previously noted, FIG. 2D illustrates additional information related to a specified network topology for the managed overlay virtual computer network of FIG. 2C. In particular, the overlay virtual computer network is illustrated in FIG. 2D as including two distinct logical subnets, logical subnet 1 288*a* and logical subnet 2 288*b*. Logical subnet 1 includes computing nodes A, D and G, the logical endpoint 270a representing the LDAP server J of the integrated network-accessible LDAP service, and optionally other computing nodes 286a of entity Z's virtual computer network that were not illustrated in FIG. 2C. Logical subnet 2 includes computing node C, as well as optionally including other computing nodes 286b of entity Z's virtual computer network that were not illustrated in FIG. 2C. In addition, the logical network topology of the overlay virtual computer network includes computing node H being configured to operate as an intermediate destination between the two logical subnets, and in particular to provide firewall capabilities in this example. Computing node H is configured to have two logical network interfaces 213 in this example, including a first logical network interface H1 213a that corresponds to logical subnet 1, and a second logical network interface H2 213b that corresponds to logical subnet 2. It will be appreciated that configured network topologies may be more complex in other embodiments and situations, including in some situations to have a chain of multiple intermediate destinations through which at least some communications are forwarded, and that such intermediate nodes may perform other types of actions in some situations.

FIG. 2E includes additional information related to the mapping information 212c and 262c used by the Communication Manager modules R and S, respectively, of FIG. 2C, with the example mapping information 212c and 262c of FIG. 2E further corresponding to the example network topology information discussed with respect to FIG. 2D. Each of the groups of mapping information 212c and 262c may include multiple entries (with six example entries shown for mapping information 212c and three example entries shown for mapping information 262c) having information that has some similarities to a routing table entry.

In particular, in this example, mapping information 212c used by the Communication Manager module R 210 in FIG. 2C includes information for each entry that includes the following: a virtual computer network identifier 213a, which in this example is a network identifier corresponding to the overlay virtual computer network provided for entity Z; a source node interface identifier 213b, which in this example includes an "A" to correspond to the single logical network interface for computing node A and a "C" to correspond to the single logical network interface for computing node C (while not illustrated, other entries for computing nodes 205b and 205d may also be included in the mapping information); a destination virtual network address identifier 213c; an associated destination substrate network address 213d that is mapped to that destination virtual network address identifier for that source node interface; and optionally various other information 213e. The optional other information may include, for example, a destination hardware address provided to associated computing nodes for use in representing particular destination computing nodes, information about expiration times or other use criteria for particular entries, etc.

Thus, in the example of FIG. 2A, when computing node A initiates the sending of a communication to computing node G, the sent communication includes the destination virtual network address of "10.0.0.3" for computing node G. In this example, the entry 213v provides the best match for the indicated destination virtual network address, such as based on the use of longest prefix matching to select the entry that matches the destination virtual network address and has the longest number of matching characters that are specified. The substrate network address for entry 213v in this example is "200.0.10.2", corresponding to computing node G to which the communication will be directed. Thus, entry 213v will be used for communications sent from computing node A to computing node G. Other matching and mapping techniques may be optionally employed rather than longest prefix matching in some embodiments, such as by first attempting to find an exact one-to-one match in the mapping information and then employing longest prefix matching if an exact match cannot be found. Different criteria may also be used in particular situations and embodiments to determine whether to attempt to use one-to-one matching, longest prefix matching, or a combination of the two approaches (e.g., determining whether to find a one-to-one match first or employ longest prefix matching first). This criteria may be based on the source or destination of the communication (e.g., when the source is a computing node of the virtual computer network and the destination is an external network or node), the network traffic volume of communication going to or coming from a particular external node or network, the number of virtual network addresses associated with a particular external network, etc.

When computing node A sends an additional communication to the logical endpoint for LDAP server J in FIG. 2C, entry 213w in mapping information 212c may instead be used by Communication Manager module R. In particular, the sent additional communication includes the destination virtual network address of "10.0.0.1" for LDAP server J, which for computing node A is mapped to the substrate network address of "200.0.10.5" for computing node I, as discussed with respect to Figure C. Thus, entry 213w will be used for at least some communications sent from computing node A to LDAP server J.

If computing node A decided to send an additional communication to computing node C, as discussed previously with respect to FIG. 2C, other entries 213y and/or 213z in mapping information 212c may instead be used. In particular, if computing node A initiates the sending of such an additional communication to computing node C, the additional communication would be routed via the intermediate destination of computing node H since computing nodes A and C are part of separate logical subnets, as discussed in greater detail with respect to FIGS. 2C and 2D. Thus, the sent additional communication would include the destination virtual network address of "10.0.5.1" for computing node C. In this example, assuming that optional entry 213z is not present, the entry 213y provides the best match for the indicated destination virtual network address, such as based on the use of longest prefix matching to select the entry that matches the destination network address and has the longest number of matching characters that are specified. The substrate network address for entry 213y in this example is "200.0.10.3", corresponding to intermediate destination computing node H to which the communication will be initially directed. Thus, entry 213y will be used for communications sent from computing node A to computing node C, and more generally to any computing node of logical subnet 2 that has a virtual network address in the range of "10.0.5.0/28". In addition, it is further possible to configure more specific functionality with respect to particular computing nodes in some embodiments. For example, if communications from computing node A to computing node C are specifically configured to pass through computing node H without the normal firewall handling that it would provide, thus effectively skipping computing node H as an intermediate destination, the mapping information 212c may further optionally include the entry 213z for source computing node A and destination computing node C. If so, the example communication discussed above would instead cause the entry 213z to be selected, resulting in a substrate network address for computing node C of "200.0.0.3" being selected for use with the outgoing additional communication. Moreover, since Communication Manager module R manages both computing nodes A and C, in that example, the outgoing communication would be forwarded to computing node C by Communication Manager module R, without the communication ever being sent over the substrate network 250.

The example mapping information 262c includes information similar to that displayed for mapping information 212c, and in particular includes information for each of its entries that includes the following: a virtual computer network identifier 214a, which in this example is a network identifier corresponding to the overlay virtual computer network provided for entity Z; a source computing node interface identifier 214b; a destination virtual network address identifier 214c; an associated destination substrate network address 214d; and optionally various other information 214e. The example mapping information 262c illustrates that different logical network interfaces of a computing node may be configured to have different routing information, with the illustrated entries including information for both of the example logical network interfaces of computing node H (with the logical identifier "H1" in column 214b corresponding to the logical network interface H1 213a of FIG. 2D, and with the logical identifier "H2" in column 214b corresponding to the logical network interface H2 213b of FIG. 2D). For example, communications received on logical network interface H2 of computing node H from logical subnet 2 may validly have final destinations that are on logical subnet 1 (such as computing node A with virtual network address "10.0.0.2" and computing node G with virtual network address "10.0.0.3"), as reflected by entry 214y, while communications received on logical network interface H1 of computing node H from logical subnet 1 may be configured to not validly have final destinations that are also on logical subnet 1, as reflected by entry 214x. Accordingly, in this example, entry 214x indicates that any communication received on logical network interface H1 with a destination virtual network address in the range of "10.0.0.0/28" for logical subnet 1 will generate an error, although in other embodiments such invalid entries may instead be represented without such explicit invalid entries (e.g., by not including any valid entries that do match such destination virtual network addresses). It will be appreciated that such mapping information 212c and 262C may have various other forms and be represented in other manners in other embodiments.

In this manner, the CNS system may provide functionality that supports the use of one or more integrated network-accessible services within a managed virtual computer network overlaid on a substrate network, without any special configuration of the computing nodes of the managed virtual computer network or of the physical networking devices of the substrate network, based on communication manager modules (and edge modules) overlaying the virtual computer network on the actual physical substrate network in such a manner as to provide the desired functionality, including to support the routing of communications that are locally directed to integrated network-accessible services whose computer servers are external to the virtual computer network.

Various other types of actions than those discussed with respect to FIGS. 2A-2E may be performed in other embodiments, including for types of network addressing protocols other than IPv4 and/or IPv6.

In some embodiments, one or more modules of the configurable network service may further be configured to perform one or more additional types of functionality in at least some situations, such as by the multiple communication manager modules (optionally in a distributed manner) and/or by the system manager module. As one example, the one or more modules of the configurable network service may be configured in at least some embodiments to perform metering or other tracking of the use of one or more integrated network-accessible services for a managed virtual computer network, and to provide information about such tracking for various purposes (e.g., to enable fees to be charged to a client associated with the managed virtual computer network if the corresponding tracked activities are fee-based activities; to provide information to a client associated with the managed virtual computer network and/or to another entity regarding an amount of use of one or more integrated network-accessible services, such as to enable corresponding monitoring activities; etc.), although in other embodiments such integrated network-accessible services may instead track their own use by one or more managed computer networks. As another example, the one or more modules of the configurable network service may be configured in at least some embodiments to filter at least some communications forwarded to and/or from one or more integrated network-accessible services of a managed virtual computer network, such as based on configuration information specified for a particular network-accessible service and/or managed computer network, including to limit the rate or total quantity of such communications to be below a specified or determined threshold of use—such rate/quantity limiting or other filtering may be configured in various manners, such as based on configuration information received by a client associated with the managed virtual computer network (e.g., to limit use of a fee-based feature of the managed virtual computer network, to correspond to limitations of associated computing nodes or networking components, etc.), based on a capacity or other aspects of a particular associated computing node, etc. In addition, the one or more modules of the configurable network service may be configured in at least some embodiments to perform signaling activities if the unavailability of a computing node or computer server of an integrated network-accessible service is detected (e.g., based on the computing node or computer server failing or on a connection to the computing node or computer server being unavailable, and as may be detected based on a lack of response or other information from the computing node or computer server for a period of time or to one or more forwarded communications or other messages or based on other liveness checking techniques), such as to facilitate the use of new or existing (if any) alternative computer servers of the integrated network-accessible service, to optionally notify other computing nodes of the managed virtual computer network of the unavailability to inhibit future communications from being forwarded to the integrated network-accessible service while it is unavailable (e.g., if the pool for the managed computer network included only a single computer server of the integrated network-accessible service), to optionally perform other related activities (e.g., to initiate providing a replacement for an unavailable computer server of the integrated network-accessible service), etc.

In addition, in some situations, a communication manager module tracks or otherwise determines the virtual computer networks to which the module's associated computing nodes belong (e.g., based on entities on whose behalf the virtual computer networks operate) as part of managing the communications for the virtual computer networks, and an edge module may similarly track or otherwise determines the one or more virtual computer networks to which the module's associated external nodes belong as part of managing the communications sent to and/or from those external nodes. The determination by a communication manager module of a corresponding virtual computer network for an associated computing node and/or the determination by a edge module of a corresponding virtual computer network for an associated external node may be performed in various ways in various embodiments, such as by interacting with a system manager module that provides that information, by tracking software modules or other programs executing on such computing nodes, by tracking entities associated with such computing nodes, based on communications sent by and/or to the nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes and external nodes, such as by tracking and/or managing which computing nodes and external nodes belong to which virtual computer networks (e.g., based on executing programs on behalf of a customer or other entity), by tracking and/or managing which external nodes operate as logical nodes of which virtual computer networks, and by providing information about actual substrate network addresses or actual public external network addresses that correspond to virtual network addresses used for a particular virtual computer network (e.g., by a particular customer or other entity).

In addition, as previously noted, configuration information that is specified for a virtual computer network may include various network topology information, and various computing nodes and external nodes in various locations may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes (e.g., database services and storage); constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes or external nodes of the customer, so as to transparently provide computing nodes of a virtual computer network (including nodes located remote from the substrate network) with the appearance of operating on a dedicated physical network.

Figure 3:
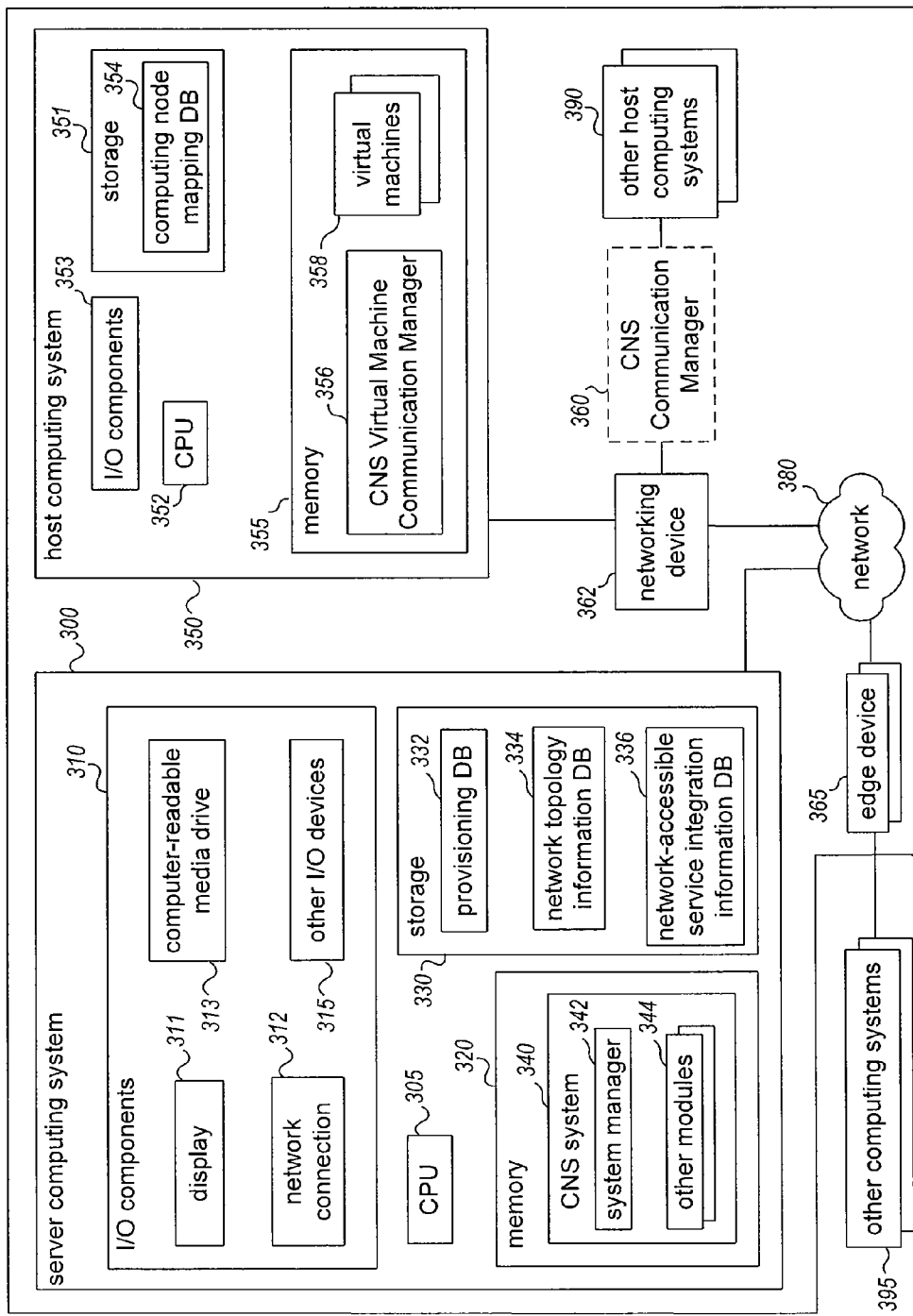
FIG. 3 is a block diagram illustrating example computing systems suitable for executing an embodiment of a system for managing communications involving computing nodes.

FIG. 3 is a block diagram illustrating example computing systems suitable for executing an embodiment of a system for managing communications involving computing nodes of one or more managed computer networks that have one or more integrated network-accessible services. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities, as well as to optionally provide one or more network-accessible services that are available for use by the managed computer networks. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge. In addition, in this example, one or more edge devices 365 may operate as or be associated with one or more edge modules (not shown) to facilitate integration of external nodes and/or external computer servers of network-accessible services into managed virtual computer networks, such as one or more of the external computing systems 395 or other external nodes (not shown).

The computing system 300 in this example operates to configure and manage virtual computer networks within the group 399, as well as to provide other functions (e.g., the provisioning, initialization, and execution of programs on computing nodes, the management of one or more available network-accessible services, etc.). The computing system 300 includes one or more CPU ("central processing unit") processors 305, various I/O ("input/output") components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes one or more CPU processors 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358 and in some embodiments including various software instructions that when executed program one or more of the CPU processors 352 to provide the described functionality. The Communication Manager module 356 maintains various mapping information 354 on storage related to the computing nodes 358 and other computing nodes, such as in a manner similar to mapping information 212a, 212c, 262a and 262c of FIGS. 2A-2E. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks. In addition, some of the computing systems of the group 399 may be used to provide the functionality of one or more network-accessible services, including to operate as computer servers for those network-accessible services.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about configured network topology to be emulated for one or more managed virtual computer networks, including information about any integrated external nodes, may be stored in the database 334 on storage 330 by the system 340, and used to provide corresponding information to the Communication Manager modules at various times. In addition, information about the use of one or more network-accessible services integrated into one or more managed virtual computer networks may be stored in the database 336 on storage 330 by the system 340, such as in a manner similar to information 294 of FIG. 2C, and used to provide corresponding information to the Communication Manager modules at various times. In this example, the system 340 in memory 320 includes a system manager module 342 and optionally other modules 344, with the communication manager modules 356 and 360 being a further part of the distributed CNS system in this example. The CNS system and the modules 342 and 344 may each in some embodiments include various software instructions that when executed program one or more of the CPU processors 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to support the integration of particular computer servers of particular network-accessible services into particular provided virtual computer networks. Such interactions may, for example, enable the computing nodes 358 and/or other computing nodes to inter-communicate and to communicate with integrated network-accessible services in a secure manner over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is a flowchart of an example embodiment of a CNS System Manager routine 400. The routine may be provided by, for example, execution of the system manager module 110 of FIGS. 1A and/or 1B, the system manager module 290 of FIGS. 2A-2E, and/or the system manager module 342 of CNS system 340 of FIG. 3, such as to assist in managing communications between multiple computing nodes across one or more intermediate networks, including to manage communications that involve computer services of network-accessible services integrated into one or more virtual computer networks, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting communication manager modules with determinations of whether communications are authorized.

In the illustrated embodiment, the routine begins at block 405, where a request is received. The routine continues to block 410 to determine the type of request. If it is determined that the type of request is to associate one or more computing nodes and/or external nodes with a particular managed virtual computer network provided for an indicated entity, such as if those nodes are executing or are to execute one or more programs on behalf of that entity, or are otherwise designed or configured to provide one or more desired types of functionality for that entity, the routine continues to block 415 to associate those nodes with that indicated entity and virtual computer network. In some embodiments, the routine may further determine one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems, and any external nodes may have various forms in various embodiments and situations. In addition, in some embodiments the routine may obtain and store various types of configuration information for the virtual computer network, such as a range of virtual network addresses for use with the virtual computer network, a specified network topology for the virtual computer network, etc. The routine then continues to block 420 to store mapping information for the nodes and the managed virtual computer network, including any received configuration information. For example, in the illustrated embodiment, the routine stores, for each computing node and each group of one or more external nodes, an indication of a corresponding substrate network address, one or more virtual network addresses for the virtual computer network, and optionally other information (e.g., a corresponding virtual hardware address, an indication of the associated entity, information about a logical location and/or function of the node in the specified network topology, etc.). As discussed in greater detail elsewhere, the substrate network address or external network address corresponding to a node may in some embodiments be a network address specific to that single node, while in other embodiments may instead refer to a sub-network or other group of multiple nodes, such as may be managed by an associated Communication Manager module and/or edge module. Furthermore, the routine may in some embodiments and situations obtain and store various types of configuration information regarding one or more network-accessible services to be integrated into a virtual computer network, such as an identification of each such network-accessible service, an indication of how many computer servers of each such network-accessible service are to be used in a pool for the virtual computer network, an indication of one or more particular virtual network addresses to assign to each such network-accessible service, etc. After block 420, the routine continues to block 422 to optionally provide information about the node(s) and their configuration to one or more communication manager modules and/or one or more edge modules associated with those nodes, although in other embodiments instead provides such information upon request from the communication manager modules and/or edge modules.

If it is instead determined in block 410 that the type of received request is a request for address resolution for a virtual network address of a target node or other computer system of interest, such as from a communication manager module or edge module on behalf of a managed node, the routine continues instead to block 425, where it determines whether the request is authorized in one or more ways, such as based on whether the managed node on whose behalf the request is made is authorized to send communications to a target node whose virtual network address resolution is requested (e.g., based on the virtual computer network(s) to which the two nodes belong), based on whether the managed node on whose behalf the request is made is a valid node that is currently part of a configured virtual computer network, and/or based on whether the request is received from the communication manager module or edge module that actually manages the indicated node on whose behalf the request is made. If the request is determined to be authorized, the routine continues to block 430, where it obtains a virtual network address of interest to be resolved for a particular target node of interest, such as may be included with the request received in block 405, or previously stored and currently identifiable for the target based on other received information. The routine then continues to block 435 to retrieve stored information for the target that is associated with the particular virtual network address, and in particular to retrieve information that associates that target network virtual network address to one or more substrate network addresses for one or more network locations that correspond to the target (e.g., substrate network locations of one or computing nodes or network-accessible service computer servers to which the target virtual network address is associated), such as may be previously stored with respect to block 420, and optionally to also provide other information for the target virtual network address (e.g., an associated virtual hardware address, an indication regarding whether the target network address corresponds to a physically implemented computing node with an actual substrate network address or instead to a logical networking device that does not have an actual substrate network address, information about a role or status of the device corresponding to the virtual network address with respect to configured network topology information, information about whether the target network address is external to a current location such that communications to the target will use one or more intermediate destination edge devices and/or edge modules, information about whether communications to the target network address will use one or more intermediate computing node destinations or other intermediate destinations that are not edge devices or edge modules, information about whether the target network address corresponds to an integrated network-accessible service, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or by not responding to that received request. In addition, in other embodiments the routine may perform one or more other tests to validate a received request before responding with the requested information, such as to verify that the node that initiated the request is authorized to receive that information. Furthermore, in the illustrated embodiment, communication manager modules perform operations to select particular intermediate destinations to use for particular communications, including in some situations a particular computing node or network-accessible service computer server when multiple such computing nodes or computer servers are associated with a particular virtual network address (e.g., in accordance with associated configuration information), such as in an individualized manner for each of at least some communications, although in other embodiments the routine 400 may instead perform some or all such actions (e.g., as part of block 435, and if the same one or more computing nodes or computer servers are repeatedly used for multiple communications between a source and an indicated destination virtual network address).

If it is instead determined in block 410 that the received request is of another type, the routine continues instead to block 485 to perform one or more other indicated operations as appropriate. For example, in some embodiments, the routine may receive requests to update stored information about particular nodes, such as if a particular node was previously associated with a particular entity and/or virtual computer network but that association ends (e.g., one or more programs being executed for that entity on that node are terminated, the node fails or otherwise becomes unavailable, an associated user or other client changes specified configuration information for the node, etc.), and may optionally provide such updated information to one or more communication manager modules of the provided virtual network. Similarly, in some embodiments, the routine may receive requests to update stored information about external nodes or otherwise about specified network topology for a virtual computer network, including to add, remove or configure edge modules in some situations, and optionally to provide such updated information to one or more communication manager modules of the provided virtual network. The routine may also take additional actions at times to support the use of one or more available network-accessible services, such as to use a consensus algorithm to select a master server from a pool of multiple computer servers for a managed computer network (e.g., if the current master server in the pool becomes unavailable), to dynamically expand or shrink the quantity of computer servers in the pool (e.g., based on current demand, based on current or previously specified instructions from the client, etc.), to replace a computer server in the pool that becomes unavailable, etc. The routine may also perform a variety of other actions related to managing a system of multiple nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate.

After blocks 422, 440 or 485, the routine continues to block 495 to determine whether to continue, such as until an explicit indication to terminate is received. If it is determined to continue, the routine returns to block 405, and if not continues to block 499 and ends.

Figure 5A:
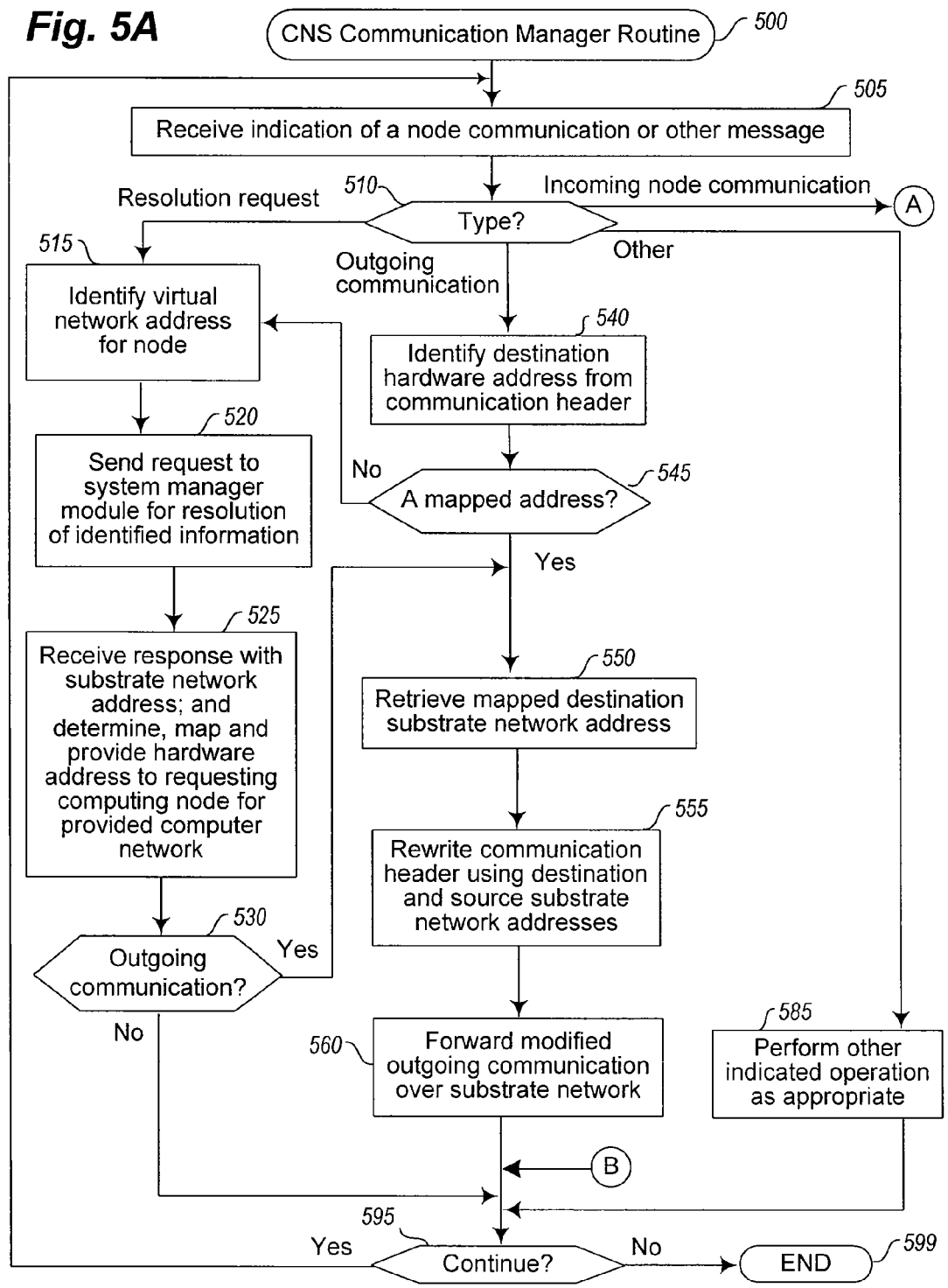
FIGS. 5A-5B illustrate a flow diagram of an example embodiment of a CNS Communication Manager routine.
Figure 5B:
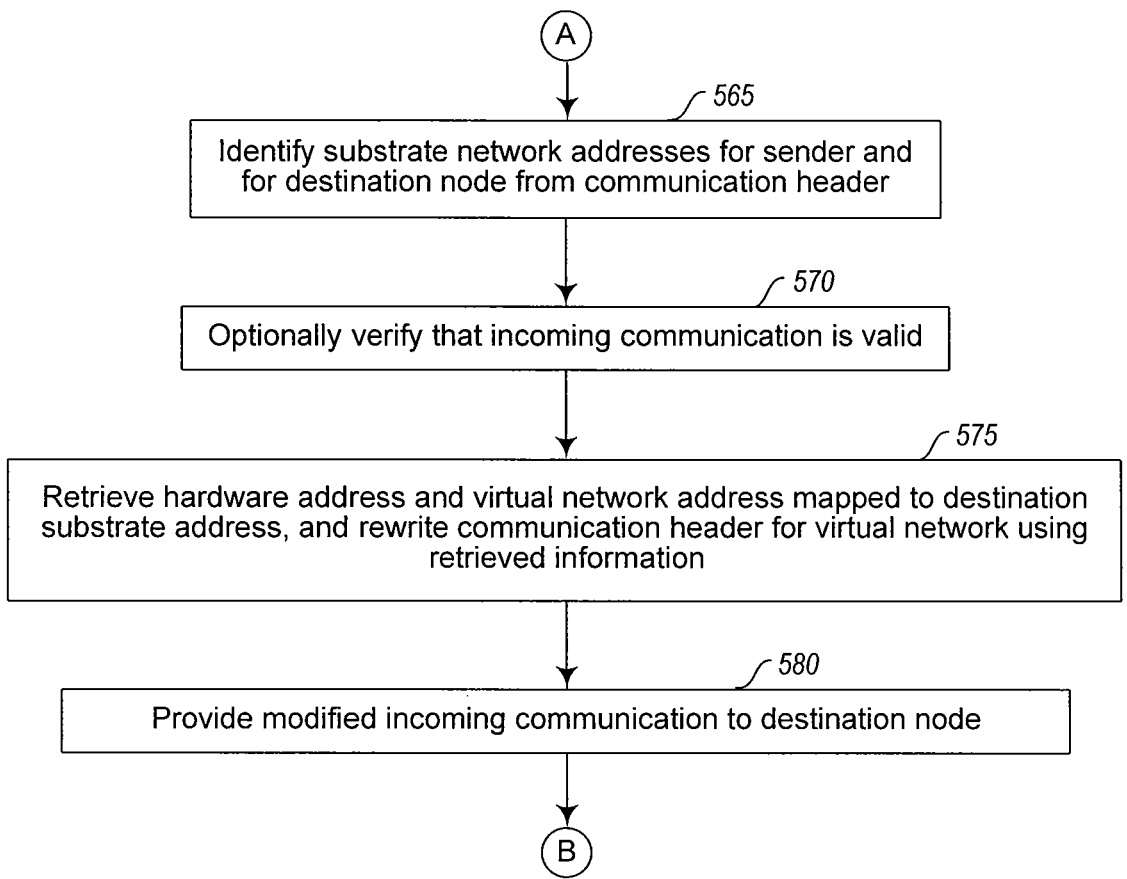

FIGS. 5A-5B are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2E, the Communication Manager modules 356 and/or 360 of FIG. 3, and/or a communication manager module (not shown) of the CNS service 105 of FIG. 1A (e.g., one of the other modules 115), such as to manage communications to and from an associated group of one or more computing nodes and/or one or more associated network-accessible service computer servers connected to one or more shared intermediate networks used as a substrate, including to determine whether to authorize communications to and/or from the managed computing nodes, and to support interactions with integrated network-accessible services for at least some communications.

The routine begins at block 505, where an indication is received of a node communication or other message. The routine continues to block 510 to determine the type of communication or other message and proceed accordingly. If it is determined in block 510 that the message is a request from an associated managed computing node for resolution of a virtual network address (e.g., an ARP request), the routine continues to block 515 to identify the target virtual network address of interest indicated in the request. The routine then continues to block 520 to send a request to a system manager module for network address resolution for the identified target network address for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, as well as one or more network-accessible services that are each integrated into one or more virtual computer networks, while in other embodiments at least some such information may instead be provided to the routine by the computing nodes and/or by the system manager module, or instead the system manager module may track and store that information without it being provided to and tracked by the current routine. While not illustrated here, in other embodiments and situations such resolution requests may be handled in other manners. For example, if a computing node being managed by a particular communication manager module provides a resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated layer 3 network layer virtual network address, in other embodiments the resolution request may have other forms, or computing nodes may request other types of information about computing nodes that have indicated target virtual network addresses.

In the illustrated embodiment, the routine next continues to block 525 to receive a response from the system manager module that includes a substrate network address and/or other information corresponding to the identified target virtual network address, and stores information locally that maps that substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target virtual network address. As discussed in greater detail elsewhere, the substrate network address response that is provided may in some embodiments include a substrate network address that is specific to the target destination of interest, while in other embodiments the substrate network address may correspond to an intermediate computing node of the virtual computer network via which communications to the target destination will be passed for some or all sending computing nodes, or may instead correspond to a sub-network or other group of multiple computing nodes to which the indicated computing node belongs, such as to correspond to another communication manager module that manages those other computing nodes. If only some inter-node communications to the target destination will be passed through a particular intermediate computing node, such as for only some sending computing nodes, it will be appreciated that the routine may obtain and store multiple entries for the target destination, such as to include different information to use for different sending computing nodes that initiate inter-node communications to the target destination. The routine then continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination node) or no response, and if so may not send any response to the requesting computing node or may send a corresponding error message to that computing node.

If it is instead determined in block 510 that the type of communication or other message is an outgoing node communication from a computing node managed by the routine to another indicated target destination that is not a computing node also managed by the routine, the routine continues to block 540 to identify the indicated hardware address for the indicated target destination from the communication header. The routine will similarly continue to block 540 if communication manager module functionality of the routine is being performed by an edge module, and the edge module has received a communication from an external node that is intended for one of the virtual computer network's multiple computing nodes that are connected to the substrate network.

In block 545, the routine then determines whether that destination hardware address is a hardware address previously mapped to a substrate network address corresponding to the final destination, such as previously discussed with respect to block 525. If not, in some embodiments the routine continues to block 515 to perform blocks 515-525 to determine such a corresponding substrate network address for the outgoing node communication, while in other embodiments such actions are not performed (e.g., if the indicated hardware address is not a mapped address, the routine may cause the outgoing node communication to fail, such as with an error message back to the sending node; if the indicated hardware address is not mapped but the destination network address is an external address of an external computer system that is not part of the virtual computer network, to proceed to perform blocks 550-560 to send the communication to an edge device for forwarding outside of the substrate network; etc.).

If the indicated hardware address is a mapped address, or the check is not performed, the routine continues to block 550 to retrieve the physical substrate network address that is mapped to the hardware address (or multiple physical substrate network addresses if there are multiple computing nodes or network-accessible service computer servers associated with the target virtual network address), as well as information about any configuration associated with the indicated target destination or with the source of the communication. As discussed in greater detail elsewhere, if the communication is to be directed to one or more intermediate destination computing nodes along a routing path to the final destination, the substrate network address that is used may correspond to a first such intermediate destination computing node as an initial destination. Similarly, if the communication is to be directed to a final destination that is an external computer system at a remote location, and there are not any computing nodes of the virtual computer network that are configured to act as intermediate destinations along a routing path to the final destination, the substrate network address that is used may correspond to an edge module or similar device at the current location that will act as an initial destination to facilitate forwarding the communication on to the final destination at another location. Moreover, if the communication is to be directed to an integrated network-accessible service, the substrate network address that is used may correspond to one or more computer servers of that integrated network-accessible service that are not part of the managed computer network. In addition, as discussed in greater detail elsewhere, the retrieval of the substrate network address to use may include using locally stored mapping information, such as based on a longest prefix match to various entries in the stored mapping information. In addition, if any associated configuration information is applicable, the routine then determines whether and how to send the communication in accordance with the configuration, including one or more particular destination computing nodes or network-accessible service computer servers to receive the communication if multiple such computing nodes or computer servers are associated with the target virtual network address—if a determination is made not to forward the communication in accordance with the configuration, the routine may return an error message to the sender or instead silently drop the communication without an indication to the sender, and continue to block 595 without performing blocks 555 and 560.

In block 555, for each destination computing node or network-accessible service computer server to receive the communication, the routine then rewrites the communication header in accordance with a networking address protocol for one or more intermediate substrate networks between the sending computing node and destination using the corresponding substrate network address retrieved in block 550, although in other embodiments the sending of a communication to multiple destination computing nodes or network-accessible service computer servers may be performed in other manners (e.g., if multiple such destination computing nodes/computer servers are managed by a single destination communication manager module, to send a single communication to that destination communication manager module, and to have that destination communication manager module provide appropriate corresponding copies to each of the managed destination computing nodes/computer servers). The header rewriting for a particular communication to be sent may further include changing other information in the new header, including changing a virtual network address for the sending computing node to be a corresponding substrate network address, and in at least some embodiments includes modifying the received communication without encapsulation as part of an overlay of the virtual computer network over the one or more intermediate substrate networks. Furthermore, for a communication whose destination hardware address corresponds to a logical networking device, the routine in block 555 may further perform other modifications that correspond to providing logical networking functionality to emulate the actions and functionality that would be performed by the one or more logical networking devices that would be used to forward the communication to the destination in accordance with the configured network topology for the virtual computer network. In block 560, the routine then facilitates the providing of each modified outgoing communication to its destination, such as by initiating forwarding of the modified outgoing communication over the substrate intermediate network(s) toward the destination. While not illustrated here, in other embodiments various additional types of processing may be performed for outgoing node communications, such as to verify that the communications are valid or otherwise authorized in various ways (e.g., to verify that the sending computing node is authorized to send communications to the destination, such as based on being associated with the same entity or part of the same virtual computer network, based on the sending computing node and destination being associated with different entities that are authorized to inter-communicate, based on the type of communication or other information specific to the communication, etc.).

In some embodiments, there may be an intermediate destination or multiple alternative intermediate destinations for use in forwarding a communication to a final destination, such as multiple alternative intermediate computing nodes for use in exchanging communications between other computing nodes in accordance with a specified network topology of a managed virtual computer network. If a single intermediate destination is to be used, the destination substrate network address retrieved in block 550 will correspond to that intermediate destination. If multiple alternative intermediate destinations are available, the system manager module selects a particular such alternative intermediate destination to use in the illustrated embodiment, such as may be identified by the current routine with respect to information received in block 525. Maintaining the use of a single such alternative intermediate destination between a pair of sending/destination nodes may provide various benefits, including to enable continuity for a particular flow of communications or other group of multiple communications back and forth between two nodes. In other embodiments, the selection of such a particular intermediate destination to use for a particular communication may be made in other manners, including by the routine 500 (e.g., with respect to block 550), and optionally in a dynamic manner for some or all such communications. For example, the routine 500 may instead receive in block 525 a list or other indication of multiple substrate network addresses corresponding to some or all of the multiple alternative intermediate destinations, and may then use that information as part of selecting a particular intermediate destination to use in a particular situation, as discussed in greater detail elsewhere. In a similar manner, if a destination is a network-accessible service that has a pool with multiple computer servers, the system manager module selects a particular such computer server to use in the illustrated embodiment, such as may be identified by the current routine with respect to information received in block 525, while the selection of such a particular intermediate destination to use for a particular communication may be made in other manners in other embodiments, including by the routine 500 (e.g., with respect to block 550), and optionally in a dynamic manner for some or all such communications. For example, the routine 500 may instead receive in block 525 a list or other indication of multiple substrate network addresses corresponding to some or all of the multiple computer servers of the pool, and may then use that information as part of selecting a particular computer server to use in a particular situation, as discussed in greater detail elsewhere.

If it is instead determined in block 510 that the received message is an incoming node communication for one of the managed computing nodes or one of the managed network-accessible service computer servers from a node managed by a different communication manager module or by a edge module, the routine continues instead to block 565 to identify the substrate network addresses for the sender and for the destination computing node/computer server from the communication header. The routine will similarly continue to block 565 if communication manager module functionality of the routine is being performed by an edge module, and the edge module has received a communication from a managed computing node via the substrate network that is intended for an external computing system that is not connected to the substrate network. After block 565, the routine continues to block 570 to optionally verify that the incoming communication is valid in one or more ways. For example, the routine may determine whether the substrate network address for the sender is actually mapped to a node that corresponds to the location from where the communication entered the substrate network, such as based on interactions with a system manager module and/or based on other information previously obtained and stored by the routine. In addition, the routine may determine whether the substrate network address for the destination computing node/computer server corresponds to an actual managed computing node or computer server. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination substrate network address that does not correspond to a current managed computing node, the routine may drop the incoming communication and/or initiate an error message, although in some embodiments such error messages are not sent to the sending computing node.

In the illustrated embodiment, after block 570, the routine continues to block 575 to retrieve the hardware address and the virtual network address that are mapped to the destination substrate network address, and to rewrite the communication header for the virtual computer network so that it appears to be sent to a computing node with that virtual network address and hardware address. For example, in some embodiments the destination virtual network address may be obtained from the destination substrate network address itself, such as from a subset of the bits of the destination substrate network address. In addition, the destination hardware address may have previously been mapped to the destination substrate network address, such as previously discussed with respect to block 525. In situations in which such prior mapping has not occurred, the routine may instead perform blocks 515-525 to obtain such information, although such actions are not illustrated in this example. The routine may similarly rewrite the communication header for the virtual computer network so that it appears to be sent from a node with a source virtual network address corresponding to the sender. Furthermore, in at least some embodiments, the routine in block 575 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 575, the routine continues to block 580 to facilitate providing of the modified incoming communication to the destination computing node, such as by initiating forwarding of the modified incoming communication to the destination computing node.

If it is instead determined in block 510 that a message of another type is received, the routine continues to block 585 to perform one or more other indicated operations as appropriate, such as to store information about entities associated with particular computing nodes and/or external nodes, store configuration information about edge modules or other intermediate destinations, store configuration information about pools of computer servers for network-accessible services, store current or recent tracking information about intermediate destinations (e.g., current load information for particular alternative destinations or other information about current characteristics of particular alternative destinations), store information about configured network topologies for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to non-local nodes of a virtual computer network (e.g., to update information when one or more computing nodes associated with a particular virtual network address changes), perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

While not illustrated here, a similar routine to that illustrated in FIGS. 4-5B may similarly be provided for an embodiment of a network-accessible service being provided (e.g., for an embodiment of an LDAP service and/or for particular LDAP servers of such an LDAP service), including to receive requests sent from computing nodes of one or more virtual computer networks (e.g., data read requests, data write requests, etc.), to perform actions corresponding to the received requests, and to provide response information as appropriate to the computing nodes that sent the requests. Such a routine may also provide functionality to manage the network-accessible service, such as in conjunction with or instead of the system manager module of the configurable network service, including to select one or more computer servers for use in a pool to support a particular managed computer network, to dynamically scale the computer servers in the pool (e.g., upon explicit request by the managed computer network or by the client for whom the managed computer network is provided), to automatically perform a consensus algorithm or otherwise select a particular master server from multiple computer servers in a particular pool, to charge fees (if applicable) to a client for the integration and/or use of the network-accessible service within a managed computer network of the client, etc.

In addition, various embodiments may provide mechanisms for customer users and other client entities to interact with an embodiment of the system manager module for the purpose of configuring computing nodes and external nodes. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

receiving, by one or more programmed computing systems of a configurable network service that provides private computer networks to remote clients, information from a first client regarding a first virtual computer network having multiple computing nodes, the received information indicating a plurality of virtual network addresses for the first virtual computer network and including information about use by the first virtual computer network of a network-accessible Lightweight Directory Access Protocol ("LDAP") service made available by the configurable network service, wherein the LDAP service is external to the first virtual computer network and includes a pool of multiple LDAP computer servers for use by the first virtual computer network;

assigning, by the one or more programmed computing systems, one of the plurality of virtual network addresses to represent the LDAP service within the first virtual computer network, and associating other of the plurality of virtual network addresses with the multiple computing nodes;

encoding, by the one or more programmed computing systems, and for a first communication sent by one of the multiple computing nodes to a virtual network address associated with another of the multiple computing nodes, the first communication in a manner specific to a substrate network on which the first virtual computer network is overlaid, and forwarding the encoded first communication over the substrate network to a location of the another computing node within the substrate network; and for a second communication sent by one of the multiple computing nodes to the one virtual network address assigned to represent the LDAP service,
    selecting, by the one or more programmed computing systems, one of the multiple LDAP computer servers of the pool to use for the second communication based at least in part on whether the second communication is of a type that corresponds to a data write request or a data read request; and
    initiating, by the one or more programmed computing systems, providing functionality of the LDAP service to the first virtual computer network by encoding the second communication in a manner specific to the substrate network, and forwarding the encoded second communication over the substrate network to the selected one LDAP computer server.

2. The method of claim 1 wherein the LDAP service includes a plurality of computer servers, and wherein the method further comprises selecting the pool of multiple LDAP computer servers from the plurality of computer servers.

3. The method of claim 2 wherein the configurable network service further provides multiple other virtual computer networks to multiple other clients, wherein one or more of the multiple other virtual computer networks each integrate the LDAP service within that virtual computer network, and wherein the method further comprises selecting a pool of one or more of the plurality of computer servers for use with each of the one or more other virtual computer networks, the selected pools for the one or more other virtual computer networks and for the first virtual computer network having distinct computer servers of the LDAP service.

4. The method of claim 1 wherein the multiple LDAP computer servers of the pool are each connected to the substrate network and are distinct from the multiple computing nodes of the first virtual computer network.

5. The method of claim 2 wherein the selecting of the one LDAP computer server is further based in part on a location of the selected one LDAP computer server.

6. The method of claim 1 wherein the multiple LDAP computer servers of the pool include a computer server that is designated as a master server and one or more other computer servers that are designated to be replica servers that are copies of the master server, and wherein the selecting of the one LDAP computer server of the pool to which the encoded second communication is forwarded includes selecting between the master server and one of the replica servers based at least in part on the type of the second communication.

7. The method of claim 1 wherein the multiple LDAP computer servers are alternatives, and wherein the selecting of the one LDAP computer server of the pool to which the encoded second communication is forwarded is further based in part on a computing load of one or more of the multiple LDAP computer servers to enable load balancing capabilities to be provided for the multiple LDAP computer servers.

8. The method of claim 2 wherein the LDAP service made available by the configurable network service is provided by the configurable network service, and wherein the method further comprises determining one of the multiple LDAP computer servers of the pool to operate as a master server that has one or more replica servers by using a consensus algorithm to enable the multiple LDAP computer servers of the pool to determine the master server in a distributed manner.

9. The method of claim 8 wherein the determining of the one LDAP computer server of the pool to operate as the master server is performed in response to an automated modification of the LDAP computer servers that are included in the pool.

10. The method of claim 9 wherein the automated modification of the LDAP computer servers that are included in the pool includes replacing at least one of the LDAP computer servers in the pool with another LDAP computer server in response to the at least one replaced LDAP computer servers becoming unavailable.

11. The method of claim 8 further comprising, under control of the selected one LDAP computer server of the pool, receiving the forwarded encoded second communication, modifying information stored for the first virtual computer network by the master server in response to the received forwarded encoded second communication, and updating the one or more replica servers to include the modified stored information in order to maintain the one or more replica servers as copies of the master server.

12. The method of claim 2 further comprising scaling a quantity of the LDAP computer servers that are included in the pool while the first virtual computer network is in use based at least in part on use of the LDAP service by the first virtual computer network.

13. The method of claim 1 wherein the one or more programmed computing systems of the configurable network service provide multiple other virtual computer networks to multiple other clients, wherein the configurable network service provides a plurality of computing nodes for use by the first virtual computer network and by the multiple other virtual computer networks, and wherein communications sent between the multiple computing nodes of the first virtual computer network are transmitted on the substrate network in an encoded form that uses information specific to the substrate network and that uses a specified destination substrate network address for forwarding over the substrate network.

14. The method of claim 1 further comprising dynamically modifying one or more of the multiple LDAP computer servers of the pool while the first virtual computer network is operational and without stopping communications being sent to the LDAP service.

15. A non-transitory computer-readable medium having stored contents that configure a computing system of a configurable network service to perform a method, the method comprising:
  obtaining, by the configured computing system, information regarding a first virtual computer network that has multiple computing nodes and that has a plurality of associated virtual network addresses, the obtained information indicating a virtual network address of the plurality that is associated with a network-accessible Lightweight Directory Access Protocol ("LDAP") service provided by the configurable network service for use by the multiple computing nodes, wherein the LDAP service is external to the first virtual computer network and includes a pool of multiple LDAP computer servers for use by the first virtual computer network;
  encoding, by the configured computing system and for a first communication sent to a destination that is one of the multiple computing nodes, the first communication in a manner specific to a substrate network on which the first virtual computer network is overlaid, and forwarding the encoded first communication over the substrate network to the destination; and
  for a second communication sent to the indicated virtual network address associated with the LDAP service,
    selecting, by the configured computing system, one of the multiple LDAP computer servers of the pool to use for the second communication based at least in part on whether the second communication is of a type that corresponds to a data write request or a data read request; and
    initiating, by the configured computing system, providing functionality of the LDAP service to the first virtual computer network by encoding the second communication in a manner specific to the substrate network, and forwarding the encoded second communication over the substrate network toward the selected one LDAP computer server.

16. The non-transitory computer-readable medium of claim 15 wherein the pool of multiple LDAP computer servers includes a master LDAP computer server and one or more other replica LDAP computer servers, and wherein the selected one LDAP computer server is the master LDAP computer server if the second communication is a data write request and is one of the replica LDAP computer servers if the second communication is a data read request.

17. The non-transitory computer-readable medium of claim 15 wherein the obtained information is specified by a first client of the configurable network service and includes a specified network topology for the first virtual computer network and includes information regarding use of the LDAP service by the first virtual computer network, and wherein the first virtual computer network is overlaid on the substrate network for the first client without physically implementing the specified network topology for the first virtual computer network.

18. The non-transitory computer-readable medium of claim 15 wherein the computer-readable medium is a memory of the configured computing system, and wherein the contents are instructions that when executed program the computing system to perform the method.

19. A system, comprising:
one or more processors of one or more computing systems; and
one or more modules that are configured to, when executed by at least one of the one or more processors, provide networking functionality for a first virtual computer network that is overlaid on a distinct second network and that has a plurality of virtual network addresses for use with multiple computing nodes of the first virtual computer network, the providing of the networking functionality including:
receiving a first network communication directed to a destination that is one of the multiple computing nodes and is specified using one of the plurality of virtual network addresses;
encoding the first network communication in a manner specific to the second network, and sending the encoded network communication to the second network for forwarding to the destination;
receiving a second network communication directed to an indicated virtual network address of the plurality of virtual network addresses, wherein the indicated virtual network address is associated with multiple Lightweight Directory Access Protocol ("LDAP") computer servers that are external to the first virtual computer network and are available to the first virtual computer network;
selecting one of the multiple LDAP computer servers to use for the second network communication based at least in part on whether the second network communication is of a type that corresponds to a data write request or to a data read request; and
initiating sending the second network communication to the selected one LDAP computer server to enable LDAP functionality to be provided to the first virtual computer network.

20. The system of claim 19 wherein the first virtual computer network is provided for a first client who specifies information for use of the LDAP functionality by the first virtual computer network.

21. The system of claim 20 wherein the first virtual computer network is one of multiple virtual computer networks provided for multiple clients by a configurable network service, and wherein the multiple LDAP computer servers are part of an LDAP service provided by the configurable network service.

22. The system of claim 19 wherein the multiple LDAP computer servers are part of a pool for use by the first virtual computer network and include a master LDAP computer server and one or more other replica LDAP computer servers, wherein the selected one LDAP computer server is the master LDAP computer server if the second network communication is a data write request and is one of the replica LDAP computer servers if the second network communication is a data read request, and wherein the one or more modules each includes software instructions for execution by the one or more processors of the system.

23. The system of claim 19 wherein the one or more modules consist of one or more means for performing the providing of the networking functionality for the first virtual computer network.

* * * * *